US006218799B1

(12) United States Patent
Hori

(10) Patent No.: US 6,218,799 B1
(45) Date of Patent: Apr. 17, 2001

(54) CONTROL APPARATUS FOR ENGINE DRIVING MOTOR

(75) Inventor: Toshio Hori, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/473,056

(22) Filed: Dec. 28, 1999

(30) Foreign Application Priority Data

Dec. 28, 1998 (JP) ........................................ 10-372811

(51) Int. Cl.[7] ........................................ G05B 5/00

(52) U.S. Cl. ........................ 318/446; 318/9; 318/15; 318/445; 318/478

(58) Field of Search ........................ 318/9, 446, 15, 318/445, 478

(56) References Cited

U.S. PATENT DOCUMENTS 5,311,430 * 5/1994 Ishigami ........................ 318/478

* cited by examiner

*Primary Examiner*—Karen Masih
(74) *Attorney, Agent, or Firm*—Evenson, McKeown, Edwards & Lenahan, P.L.L.C.

(57) ABSTRACT

The invention provides a control apparatus for an engine driving motor having a function of driving a crankshaft of an engine and another function of generating electric power from power from the crankshaft by which an engine can be started up efficiently in a short time. The control apparatus for an engine driving motor includes a crankshaft position sensor for detecting a rotational position of a crankshaft when an engine stops, a camshaft position sensor for outputting a signal at a particular rotational position of a camshaft, and a controller for energizing, when the engine stops and power supply to the engine driving motor should be stopped, the engine driving motor to rotate the crankshaft from the rotational position of the crankshaft detected when the engine stops to a dynamically neutral position of the crankshaft, but energizing, when the engine stops and then the power supply to the engine driving motor should not be stopped, the engine driving motor to rotate the crankshaft to a particular position which corresponds to a position of the camshaft immediately prior to the particular rotational position of the camshaft.

10 Claims, 24 Drawing Sheets

CONTROL APPARATUS FOR ENGINE DRIVING MOTOR

BACKGROUND OF THE INVENTION

1. Field of the Invention

This invention relates to an engine driving motor control apparatus, and more particularly to a control apparatus for an engine driving motor which performs start-up of an engine efficiently in a short time.

2. Description of the Related Art

A control apparatus for an engine driving motor is conventionally known and disclosed, for example in Japanese Patent Laid-Open No. Hei 5-149221. The control apparatus for an engine driving motor uses a starter motor to stop a crankshaft at a position at which a comparatively low load is applied to the crankshaft when the engine stops. The control apparatus is thus directed to obtaining high speed rotation of the crankshaft with comparatively low power supply to the starter motor upon next start-up of the engine.

The control apparatus disclosed in the prior art document mentioned above, however, does not take a dynamic action upon the direction of rotation of the crankshaft when the engine is stopped into consideration.

Further, while the control apparatus used a starter motor as means for operating the crankshaft, a starter motor which is used popularly is energized through a switch which is operated by a driver of the vehicle. Therefore, where the control apparatus is applied to an engine of the type just mentioned, it cannot employ an apparatus which operates the starter motor when the engine stops.

SUMMARY OF THE INVENTION

It is an object of the present invention to provide a control apparatus for an engine driving motor having a function of driving a crankshaft of an engine and another function of generating electric power from power from the crankshaft by which an engine can be started up efficiently in a short time.

The object of the present invention described above is achieved by a control apparatus for an engine driving motor which has a function of driving a crankshaft of an engine and another function of generating electric power with power from the crankshaft, comprising a crankshaft position sensor for detecting a rotational position of the crankshaft when the engine stops, and control means for energizing, when the engine stops, the engine driving motor to rotate the crankshaft from the rotational position of the crankshaft detected when the engine stops to a dynamically neutral position of the crankshaft.

The object of the present invention described above is achieved also by a control apparatus for an engine driving motor which has a function of driving a crankshaft of an engine and another function of generating electric power with power from the crankshaft, comprising a camshaft position sensor for outputting a signal at a particular rotational position of a camshaft operatively connected to the crankshaft, and control means for energizing, when the engine stops, the engine driving motor to rotate the crankshaft to a particular position which corresponds to a position of the camshaft immediately prior to the particular rotational position of the camshaft.

The object of the present invention described above is achieved further by a control apparatus for an engine driving motor which has a function of driving a crankshaft of an engine and another function of generating electric power with power from the crankshaft, comprising a crankshaft position sensor for detecting a rotational position of the crankshaft when the engine stops, a camshaft position sensor for outputting a signal at a particular rotational position of a camshaft operatively connected to the crankshaft, determination means for determining whether or not power supply to the engine driving motor should be stopped, and control means for energizing, when the engine stops and the determination means determines that the power supply to the engine driving motor should be stopped, the engine driving motor to rotate the crankshaft from the rotational position of the crankshaft detected when the engine stops to a dynamically neutral position of the crankshaft when the engine stops, but energizing, when the engine stops and then the determination means determines that the power supply to the engine driving motor should not be stopped, the engine driving motor to rotate the crankshaft to a particular position which corresponds to a position of the camshaft immediately prior to the particular rotational position of the camshaft.

With the control apparatus for an engine driving motor, the engine can be started up efficiently in a short time using the engine driving motor which has a function of driving the crankshaft of the engine and another function of generating electric power with the power from the crankshaft.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

Figure 2:
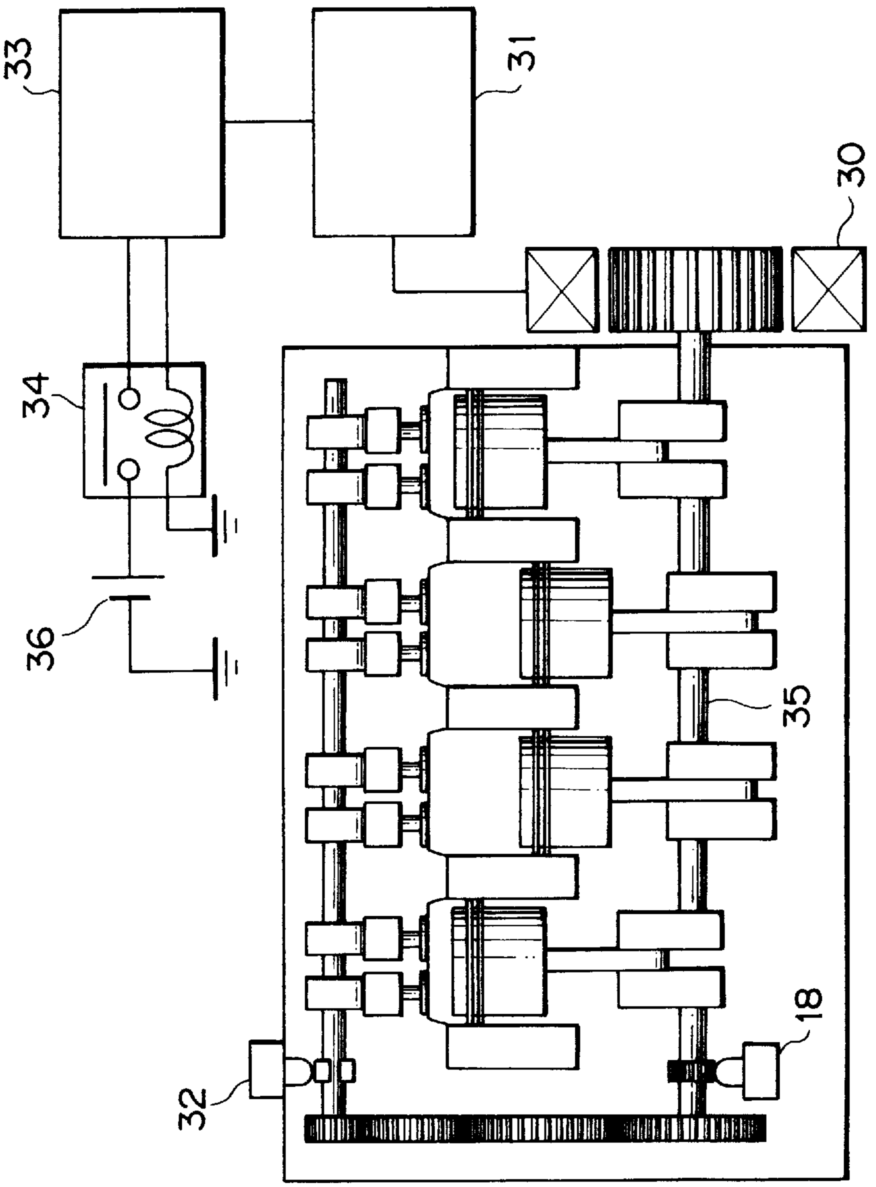
FIG. 2 is a schematic diagrammatic view showing a 4-cylinder engine in which a control apparatus for an engine driving motor according to the present invention is incorporated.

Referring first to FIG. 2, there is shown an example of an engine driven by an engine driving motor. Referring to FIG. 2, an engine driving motor 30 is directly coupled to a crankshaft 35 of an engine such that, upon start-up of the engine, the engine driving motor 30 receives supply of electric power of a battery 36 to rotate the crankshaft 35 similarly to a conventional starter motor. When the engine rotates by itself by combustion, the engine driving motor 30 receives the power of the engine and generates electric power necessary for operation of the engine. The electric power is used also to charge the battery 36. The driving of the engine driving motor 30 is controlled by a controller 31, and the degree of such generation or driving depends upon an instruction value delivered to the controller 31 from a control apparatus 33. The control apparatus 33 detects operation conditions of the engine from various sensors, successively and appropriately discriminates an operation condition of the engine driving motor 30 and delivers an instruction value to the controller 31. The sensors mentioned above include a crankshaft rotation sensor 18 and a camshaft rotation sensor 32. Each of the crankshaft rotation sensor 18 and the camshaft rotation sensor 32 detects that a mark mounted at a predetermined position on the corresponding shaft comes to the sensor position, and outputs a signal. The signals from the crankshaft rotation sensor 18 and the camshaft rotation sensor 32 are inputted to the control apparatus 33. The control apparatus 33 reads the signals inputted thereto in accordance with an algorithm determined in advance to detect the phases of the crankshaft and the camshaft to detect the speeds of rotation of them.

A relay 34 is interposed intermediately in a power supply line from the battery 36 for operation of the control apparatus 33 so that the control apparatus 33 itself can determine and execute interruption of power supply to the control apparatus 33. Due to the construction just described, when it can be determined that operation of the engine is not required originally such as upon idling of the engine, even if the driver of the vehicle does not perform an engine stopping operation, the control apparatus 33 can determine that the engine should be stopped and thus stop supply of fuel or the like to stop the engine. Then, when operation of the engine is required next such as when the driver operates the accelerator pedal, the control apparatus 33 can activate the control apparatus 33 through the controller 31 to start up the engine. By the operation described, useless fuel consumption upon idling or the like can be avoided, and the fuel cost can be augmented.

A form of the engine is described more specifically below.

Figure 3:
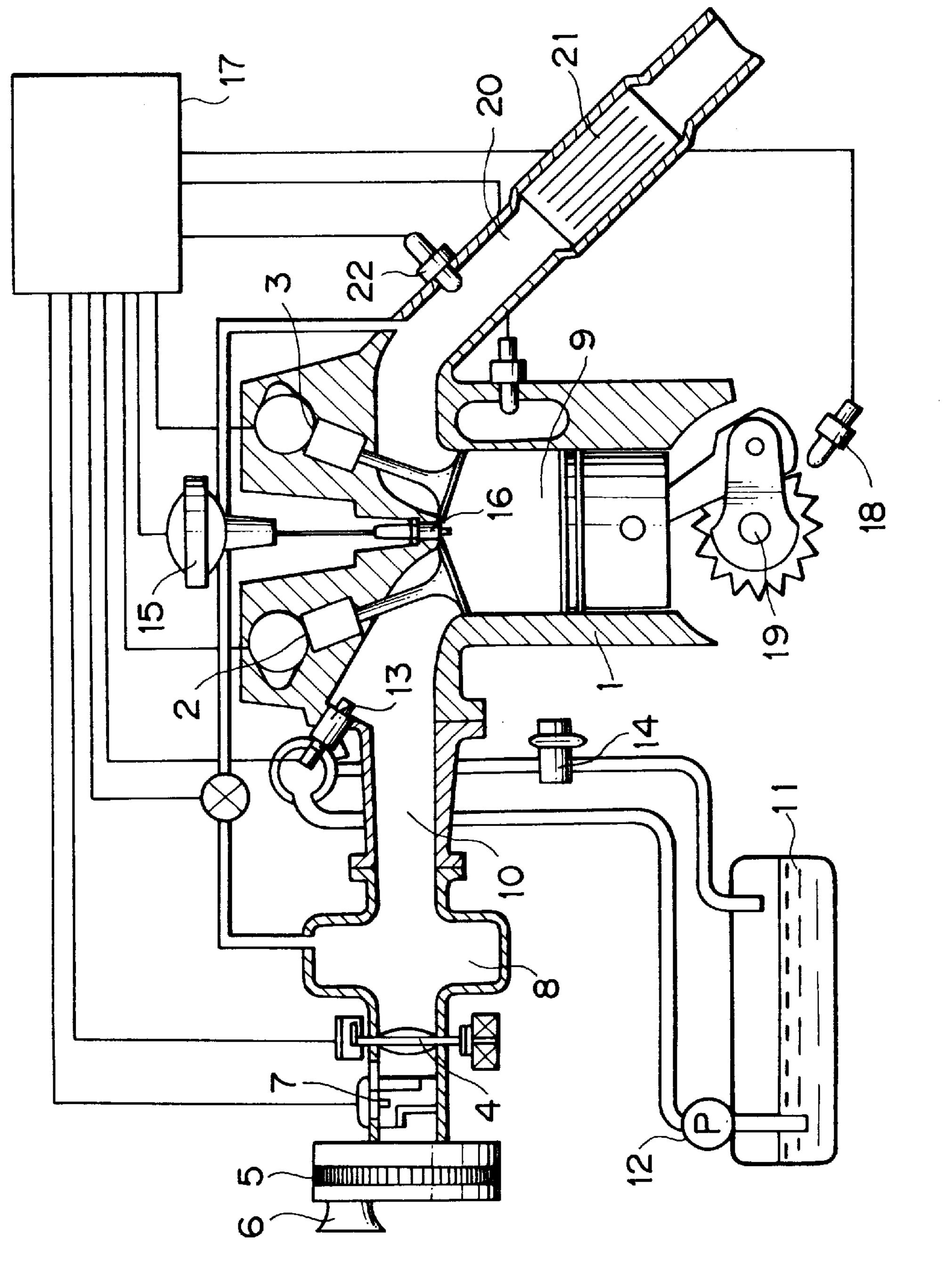
FIG. 3 is a schematic diagrammatic view showing a more detailed construction of the 4-cylinder engine of FIG. 2.

Referring to FIG. 3, air to be taken into an engine 1 is taken in through an entrance portion 6 of an air cleaner 5, passes through an air-flow meter 7 which serves as means for measuring the intake air amount Qa, and enters a collector 8. The air having been taken into the collector 8 is distributed into intake pipes 10 connected in cylinders 9 of the engine 1 and introduced into combustion chambers of the cylinders 9.

Meanwhile, fuel such as gasoline is taken in from a fuel tank 11 and pressurized by a fuel pump 12 and then supplied to a fuel system in which injectors 13 are disposed. The pressurized fuel is adjusted to a fixed pressure (for example, 3 $kg/cm^2$) by a fuel pressure regulator 14 and injected into the intake pipes 10 from the injector 13 provided in each of the cylinders 9. The injected fuel is ignited by an ignition plug 16 with an ignition signal of a high voltage produced by a corresponding ignition coil 15.

A signal indicative of an intake air flow rate from the air-flow meter 7, an angle signal POS of the crankshaft 19 from the crankshaft rotation sensor 18 and an exhaust gas detection signal from an A/F sensor 22 provided forwardly of a catalyzer 21 in an exhaust pipe 20 are inputted to a control unit 17.

The intake air flow signal detected by the air-flow meter 7 is processed by filter processing means or the like so that it can be converted into an air amount. Then, the control unit 17 divides the intake air flow rate by an engine speed and multiples the quotient by such a coefficient k which makes the air fuel ratio equal to a stoichiometric value (A/F=14.7) to determine a basic fuel injection pulse width per one cylinder, that is, a basic fuel injection amount. Thereafter, the control unit 17 performs various fuel corrections in response to an operation condition of the engine based on the basic fuel injection amount to determine a fuel injection amount and then drives the injectors to supply fuel to the cylinders in accordance with the fuel injection amount. Since an actual air fuel ratio can be discriminated from an output of the A/F sensor 22 provided for the exhaust pipe 20, when it is desired to obtain a desired actual air fuel ratio, closed loop control wherein the fuel supply amount is adjusted in response to the signal of the A/F sensor is used.

Figure 4:
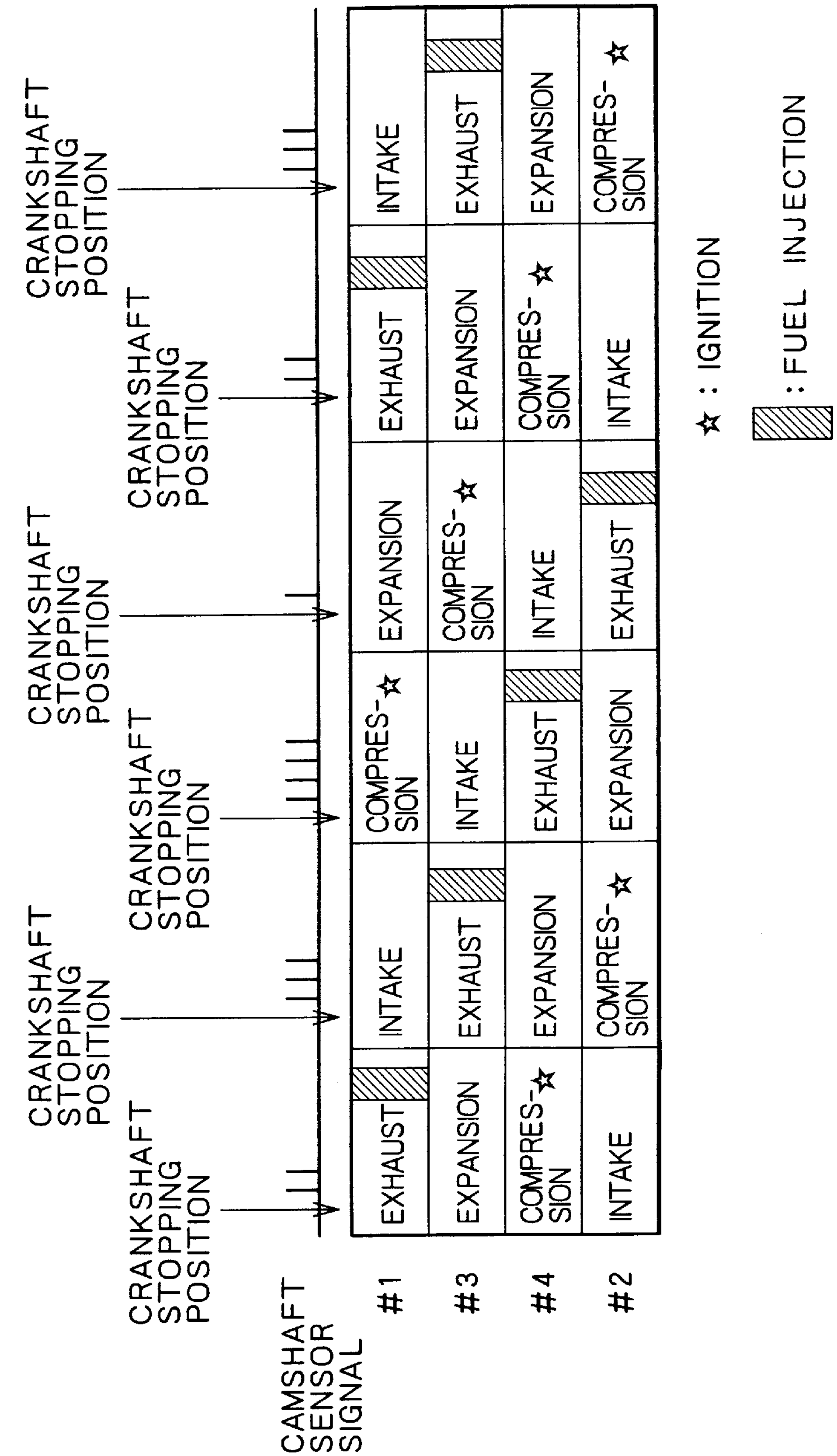
FIG. 4 is a diagrammatic view illustrating fuel injection timings and ignition timings of the 4-cylinder engine of FIG. 2.

The engine described above has such fuel injection timings and ignition timings of a 4-cylinder engine as illustrated in FIG. 4. Since injection of fuel in synchronism with the stroke of each cylinder is preferable in order that the properties of intake fuel such as, for example, a degree of carburetion of the fuel in each cylinder may be equal among the cylinders, fuel injection, for example, in the rear half of the exhaust stroke is performed as seen from FIG. 4. Ignition is performed in the real half of the compression stroke, for example, in response to a flame propagation speed upon combustion. Accordingly, the control unit 17 recognizes strokes of the cylinders and outputs signals for appropriate fuel injection and ignition. To this end, the control unit 17 receives and processes a signal of the camshaft rotation sensor 32. The camshaft rotation sensor 32 exhibits, for example, such a signal outputting form as illustrated in FIG. 4. In particular, the camshaft rotation sensor 32 outputs a signal of a high level when a mark attached to the camshaft in advance approaches the position of the camshaft rotation sensor 32, but outputs a signal of a low level in any other case. Where the engine has four cylinders as seen from FIG. 4, if four different marks are provided on the camshaft, then strokes of the individual cylinders can be recognized by discriminating the marks. In other words, numbers of High level signals different among different strokes of the cylinders are distributed to the camshaft.

Figure 22:
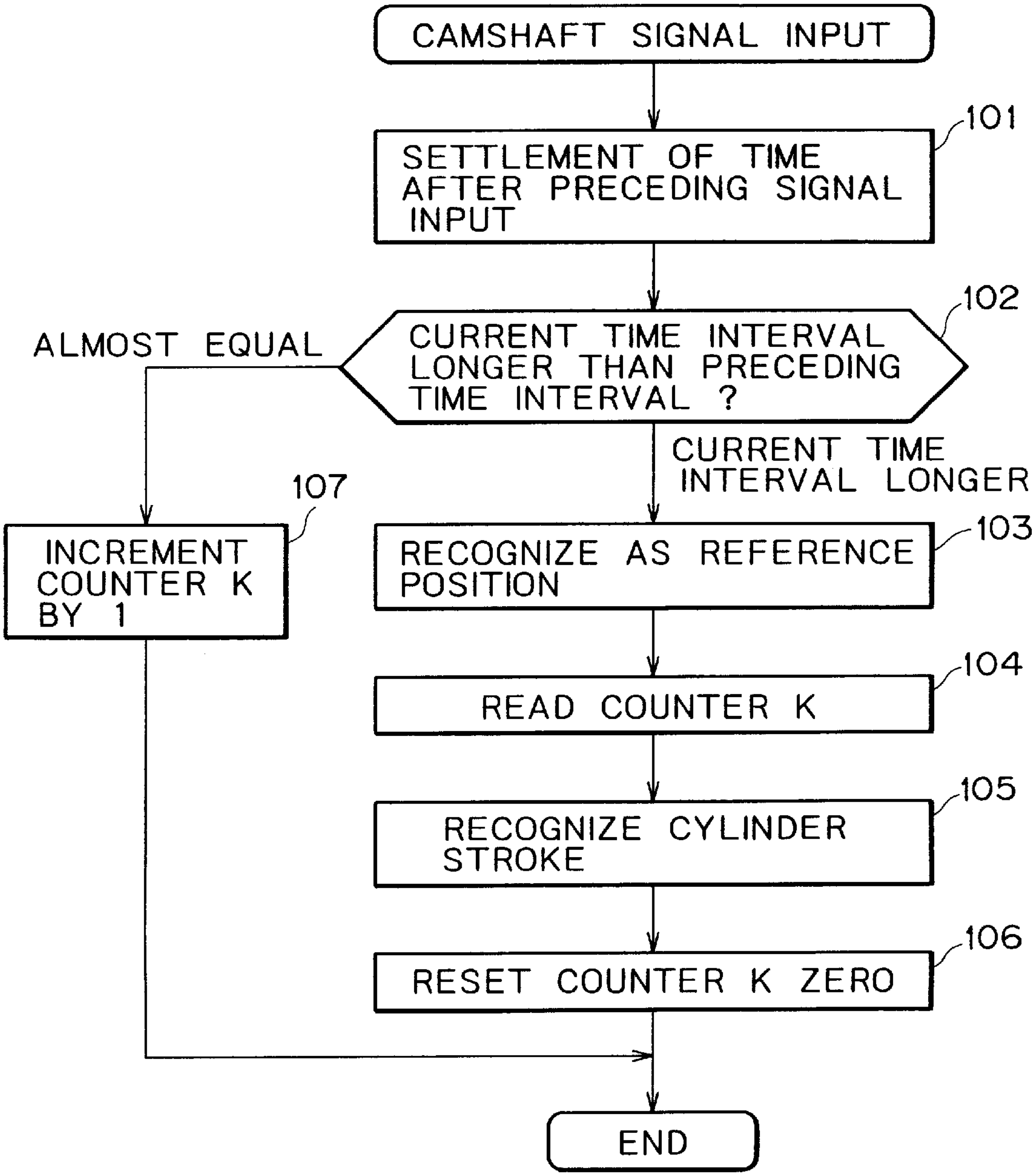
FIGS. 22 to 24 are flow charts illustrating different control manners of the 4-cylinder engine of FIG. 2 by the control apparatus for an engine driving motor according to the present invention.

An example of an arithmetic routine incorporated in an arithmetic device of the control unit 17 in advance for processing signal inputs in order to allow the signal of the camshaft rotation sensor 32 to be read by the control unit 17 is illustrated in a flow chart of FIG. 22. The arithmetic routine of FIG. 22 is started when the control unit 17 detects that the signal of the camshaft varies from the Low level to the High level and determines that an input of a camshaft signal is present. Referring to FIG. 22, first in step 101, the control unit 17 measures an interval of time after a preceding signal input to the current signal input. Then in step 102, the control unit 17 compares an interval of time between the preceding signal input and a second preceding signal input and the interval of time between the preceding signal input and the current signal input determined in step S101. Here, if one of signals of a series of cylinder signal pattern, for example, the second one of signals of a signal group including two signals when the uppermost cylinder in FIG. 4 is in the exhaust stroke, is inputted, then the difference or ratio between the times is substantially equal.

On the other hand, if a first one of signals of a new cylinder signal pattern is inputted, for example, if a first one of signals of a group including 3 signals in the exhaust stroke when the uppermost cylinder in FIG. 4 enters the intake stroke from the exhaust stroke is inputted, then the time interval upon the current measurement is significantly long. In step 102, the two patterns are identified from each other. If it is determined in step 102 that the two time intervals are substantially equal and consequently a signal of a series of cylinder signal pattern is being inputted, then the control unit 17 advances its control to step 107, in which a counter K is incremented by one. The counter K is formed as a counter which functions depending upon the structure of the entire routine and counts the number of cylinder signals in a series of. After the control of the control unit 17 advances to step 107, it ends the current processing started based on the discrimination of presence of a cam signal. On the other hand, if it is discriminated in step 102 that the current time interval is longer than the preceding time interval and consequently the currently inputted signal is a first signal of a series of cylinder signal pattern, then the control unit 17 advances the control thereof to step 103. In the present embodiment, the cam signal has an additional function of indicating a reference position for crankshaft angle control. In particular, if the marks on the camshaft for each cylinder are set such that the first signal of a series of cylinder signal pattern for the cylinder is produced at a predetermined position of the phase of the crankshaft, for example, to the BTDC 100 degrees, then the control unit 17 can also recognize the phase of the crankshaft. In step 103, the control unit 17 recognizes the reference position described above.

Then, the control unit 17 successively performs processing in steps 104 to 106. In step 104, the control unit 17 reads the value of the counter K which was incremented in step 107 and recognizes the number of signals of a signal pattern for each cylinder. Then, the control unit 17 recognizes the strokes of the individual cylinders and the phase of the crankshaft at present in step 105. In step 106, the control unit 17 resets the counter K to 0. since the counter K has completed its function of storing the number of signals of a series of signal pattern in step 105, the resetting processing for the counter K is performed in preparation for subsequent counting of the number of signals of a next series signal pattern. Thereafter, the control unit 17 ends the current processing started based on the discrimination of presence of a cam signal.

As described above, the control unit 17 can recognize the phases of the cylinders based on signal information of the camshaft rotation sensors. However, in order to allow such recognition, the crankshaft must rotate over an angle at least corresponding to one stroke of the cylinders. Further, a comparatively great amount of rotation of the crankshaft is required when rotation of the crankshaft is started from an end of a signal pattern, and a time after an end of a signal pattern until a start of a next signal pattern and a time for one stroke after then are required. This indicates that, when power supply to the control unit 17 and other necessary components is started in order to start operation in a condition wherein the engine is stopped and no power is supplied, since the control unit 17 does not recognize the actual crank phase and the crankshaft position, the crankshaft must be rotated with external power of the driving motor or the like until after the engine is thereafter started up to start fuel supply and ignition.

The reason why the control unit 17 does not recognize the crankshaft position when it receives power supply and starts its operation is that it is impossible to estimate the stopping position of the crankshaft because the relationship between the moment of inertia and the resistance to rotation of the crankshaft is not decided uniquely for a time after power supply is interrupted as a result of switching off of the ignition key until rotation of the crankshaft stops. Further, also when the crankshaft is rotated by some external force while the engine stops, it is impossible for the control unit 17 to recognize the phase of the crankshaft.

From the foregoing, the behavior of the engine upon start-up up is summarized. First, power supply to the control unit 17 is started and the control unit 17 starts processing of the program. Then, rotation of the crankshaft is started by an external force of the driving motor or the like, and the camshaft rotation sensor 32 outputs a signal at each predetermined position of the crankshaft. The control unit 17 reads the signal of the camshaft rotation sensor 32 and recognizes the strokes of the cylinders. Based on the recognition, the control unit 17 generates signals for fuel injection and ignition to cause combustion. Consequently, the engine by itself starts rotation.

Preferably, the time required for start-up of the engine is minimized. However, time is required for recognition of the cylinders by the control unit 17 as described above, and the time varies depending upon the position from which rotation of the crankshaft is started. On the other hand, since the driving motor can rotate the crankshaft using power of the battery as described hereinabove, it can stop the crankshaft at an arbitrary position. This operation can be performed even while the ignition switch is off because, even if the driver switches off the ignition switch to interrupt power supply, power supply is not interrupted since the interruption operation for the power supply can be performed by the control apparatus as described hereinabove with reference to FIG. 2. Therefore, if the driving motor is controlled to stop the crankshaft at a predetermined position when the engine stops, then the control unit 17 can specify the position of the crankshaft upon subsequent start-up of the engine.

Figure 1:
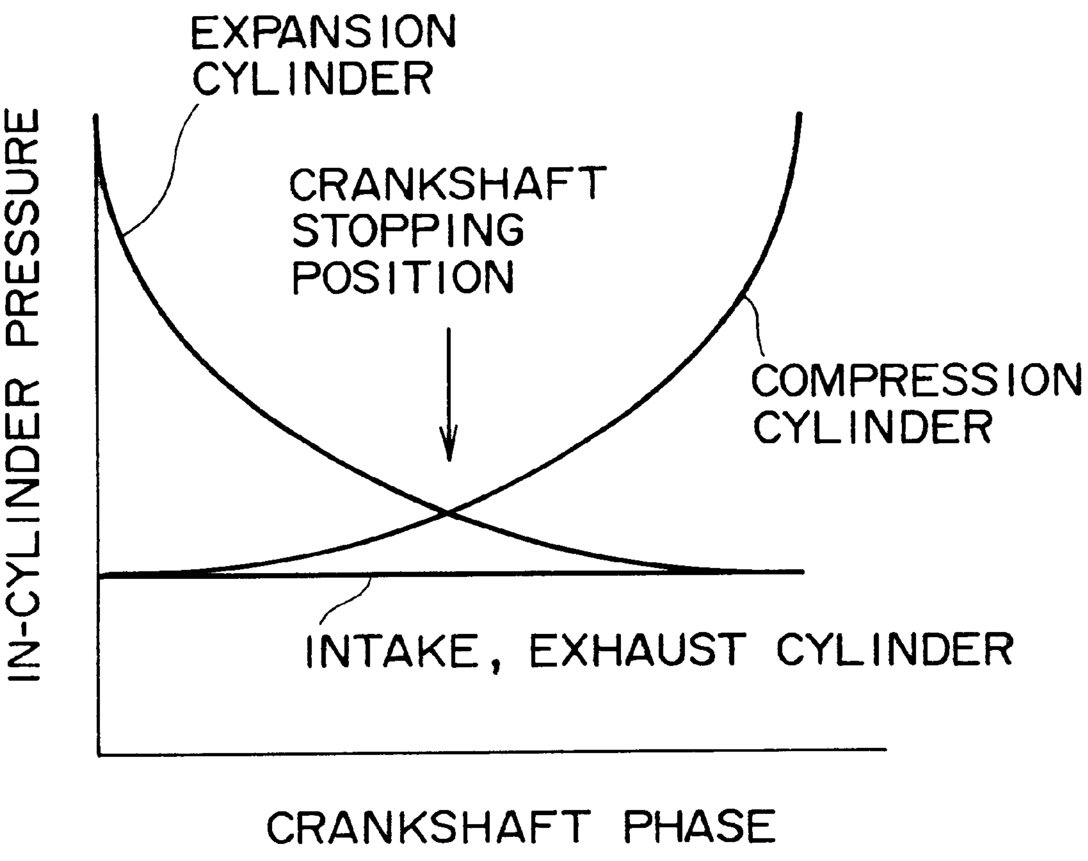
FIG. 1 is a diagram illustrating a relationship between the phase of a crankshaft and in-cylinder pressures of cylinders of a 4-cylinder engine.

Here, a dynamic balance when no external force is applied to the crankshaft while the engine stops is investigated. FIG. 1 indicates a relationship between the crankshaft position and the in-cylinder pressure of each cylinder of a four-cylinder engine. If the in-cylinder pressure is high, then it applies torque to the crank through a connecting rod. First, since a valve is opened with a cylinder which is in the intake or exhaust stroke, the in-cylinder pressure is equal to the atmospheric pressure and does not apply torque to the crankshaft. Meanwhile, both of the intake and exhaust valves are closed with a cylinder which is in the compression stroke, and as the cylinder approaches its TDC, the in-cylinder pressure rises and applies torque to the crankshaft. Consequently, the in-cylinder pressures of those cylinders which are in the intake and compression strokes become equal to each other. The intersecting point indicated by an arrow mark in FIG. 1 is a dynamically balanced point. Here, since the resistance against rotation of the crankshaft is ignored, the crankshaft does not necessarily stop at the balanced position. However, the balanced point is the most stable stopping position of the crankshaft, and if the crankshaft is stopped at this point, then the crankshaft does not move to another phase position unless a new external force is applied thereto. Accordingly, if the crankshaft phase is introduced to the crankshaft stopping position of FIG. 1 by the driving motor when the ignition switch is switched off, then in many cases, the crankshaft phase and the strokes of the cylinders upon next start-up of the engine can be estimated before a signal of the camshaft rotation sensor 32 is generated. If fuel injection and ignition are performed based on the estimation under the control of the control unit 17, then the time required for start-up of the engine can be minimized.

Figure 8:
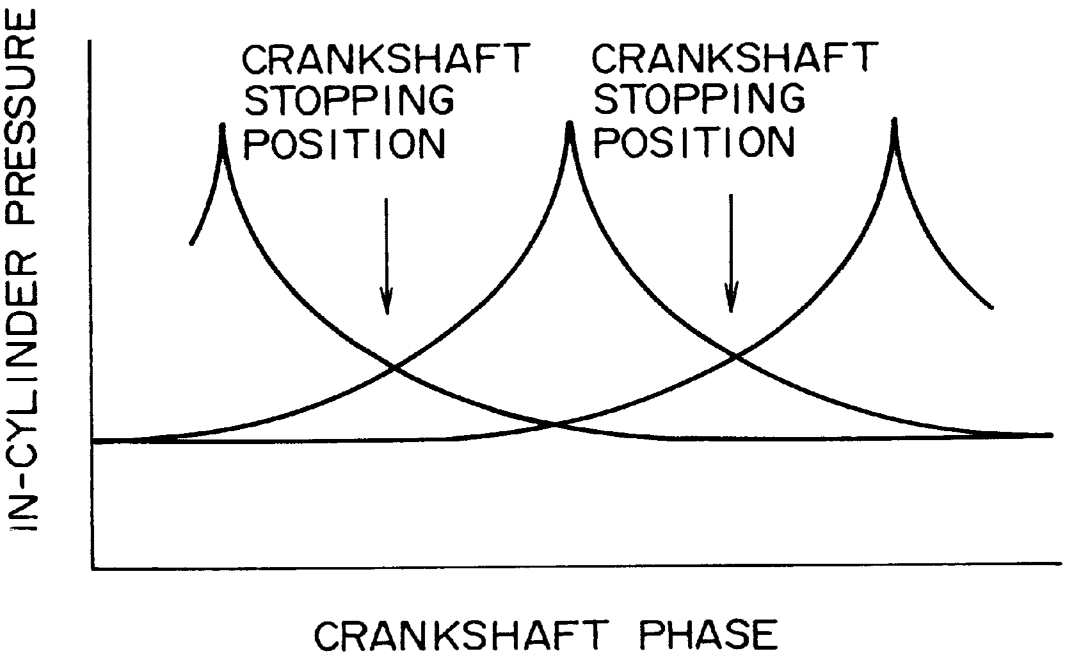
FIG. 8 is a diagram illustrating a relationship between the phase of a crankshaft and in-cylinder pressures of cylinders of a 6-cylinder engine.

While FIG. 1 illustrates the relationship between the in-cylinder pressure and the crankshaft phase of a four-cylinder engine, an example of the relationship of a 6-cylinder engine is illustrated in FIG. 8. With a 6-cylinder engine, since the stroke intervals between the cylinders are different from those of a 4-cylinder engine, the crankshaft phase exhibits a dynamic balance at positions indicated by arrow marks in FIG. 8, different from that in a 4-cylinder engine. Accordingly, if the crankshaft is stopped at any of the phases, then a similar effect to that described hereinabove with reference to FIG. 1 can be achieved. Further, though not shown, since an engine of any cylinder number such as 3, 5 or 8 has a crankshaft phase in which the crankshaft exhibits a dynamic balance, if the crankshaft is stopped at the phase, then a similar effect to that described hereinabove with reference to FIG. 1 can be achieved.

Further, while the foregoing description relates to a construction wherein the intake and exhaust valves are driven through the camshaft, since a dynamically balanced position is present even with another construction wherein electromagnetic intake and exhaust valves are employed, a similar idea can be applied to the latter construction.

Figure 23:
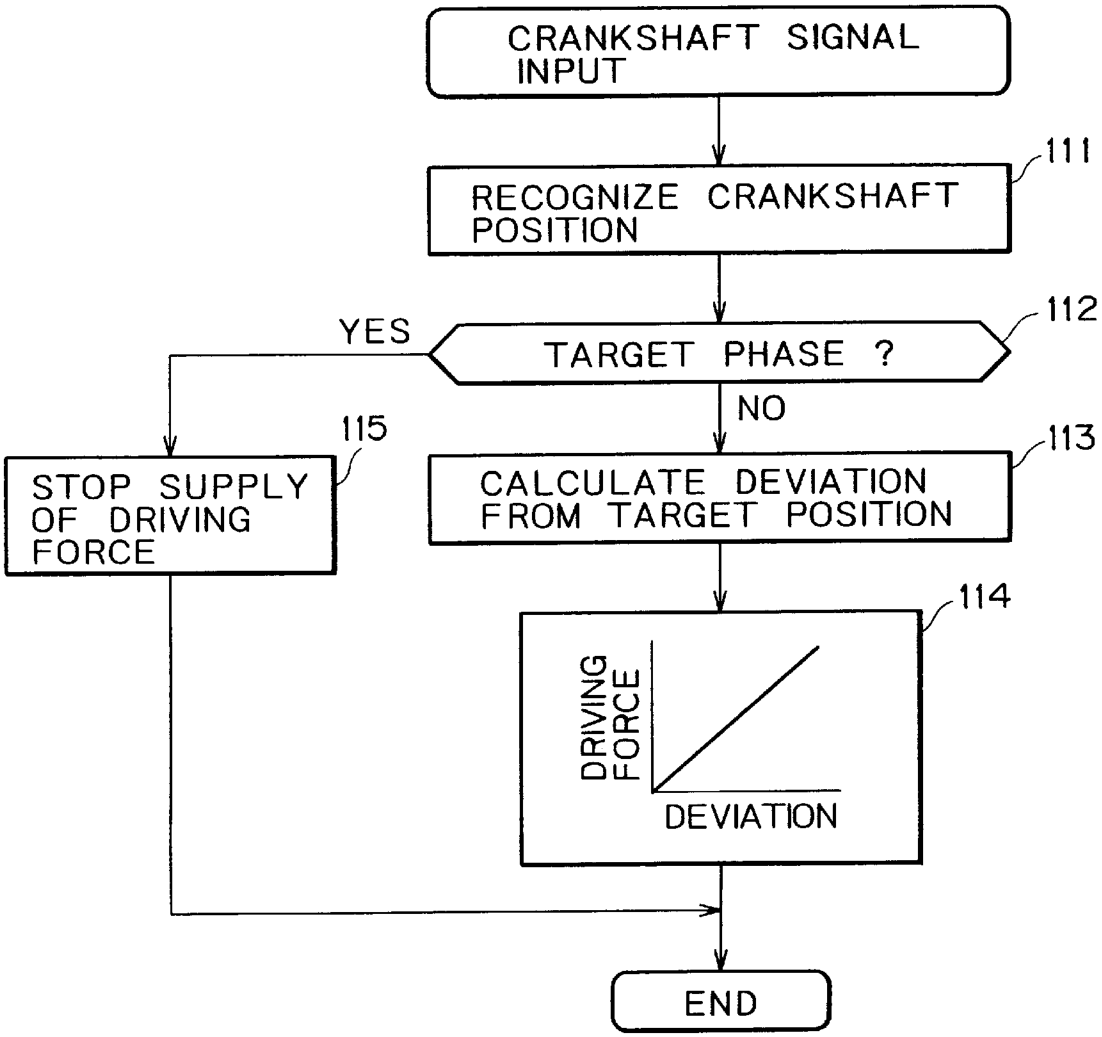

An example of a control algorithm incorporated in the control apparatus 33 for stopping the crankshaft at a desired crankshaft phase is illustrated in a flow chart of FIG. 23. The routine illustrated in FIG. 23 is executed when a signal input is received from the crankshaft rotation sensor 18. Referring to FIG. 23, first in step 111, the control apparatus 33 recognizes a crankshaft phase from the fact that a crankshaft position signal input is received. Then in step 112, the control apparatus 33 compares the actual crankshaft phase with such a target crankshaft position determined in advance as described hereinabove with reference to FIG. 1 to discriminate whether or not the target phase is reached. If the target phase is reached, then the control of the control apparatus 33 advances to step 115, in which it stops supply of the driving force, whereafter it ends the processing of the control apparatus 33. Consequently, rotation of the crankshaft is stopped, and no new crankshaft position signal is generated. Consequently, the present routine of FIG. 23 is not started any more and the crankshaft thereafter remains stably in the stopping condition.

If it is discriminated in step 112 that the target position is not reached, then the control of the control apparatus 33 advances to step 113, in which the control apparatus 33 calculates a deviation of the actual crankshaft position from the target phase. In step 114, the control apparatus 33 calculates a driving force necessary for the crankshaft to reach the target phase. In the present embodiment, a technique wherein a numerical value table is searched with the deviation to determine the driving force is adopted. If a driving force determined using such a technique as just described is applied to the crankshaft, then the crankshaft rotates to the target crankshaft position at a desired speed of rotation. For preset values of the numerical value table used in step 114, values most likely to give a target crankshaft phase may be set in advance from dynamic factors regarding rotation of the crankshaft including the resistance to rotation of the engine.

Now, control in a case wherein, when it can be determined that operation of the engine is not required originally as described above, the engine is stopped by stopping supply of fuel or the like and then, when operation of the engine becomes required such as when the driver operates the accelerator pedal, the driving motor is activated to start up the engine is described.

When it is tried to stop the engine automatically while operation of the engine is not required, the crankshaft can be stopped at an arbitrary position using the driving motor as described hereinabove. On the other hand, it is preferable that the engine is prepared to start up immediately and rotate by itself when operation of the engine becomes required later as a result of operation of the accelerator or the like. Further, as described hereinabove, fuel supply to or ignition of the engine is performed by an operation of a fuel injection valve or an ignition coil with reference to the phase at the particular point of the crankshaft, in the foregoing description, with reference to the top signal of a camshaft position signal. Accordingly, one of measures to be taken to supply fuel and cause ignition rapidly so that the engine can start rotation by itself is to set the crankshaft stopping position to a position immediately prior to the position at which the camshaft position sensor generates a reference position signal.

Figure 21:
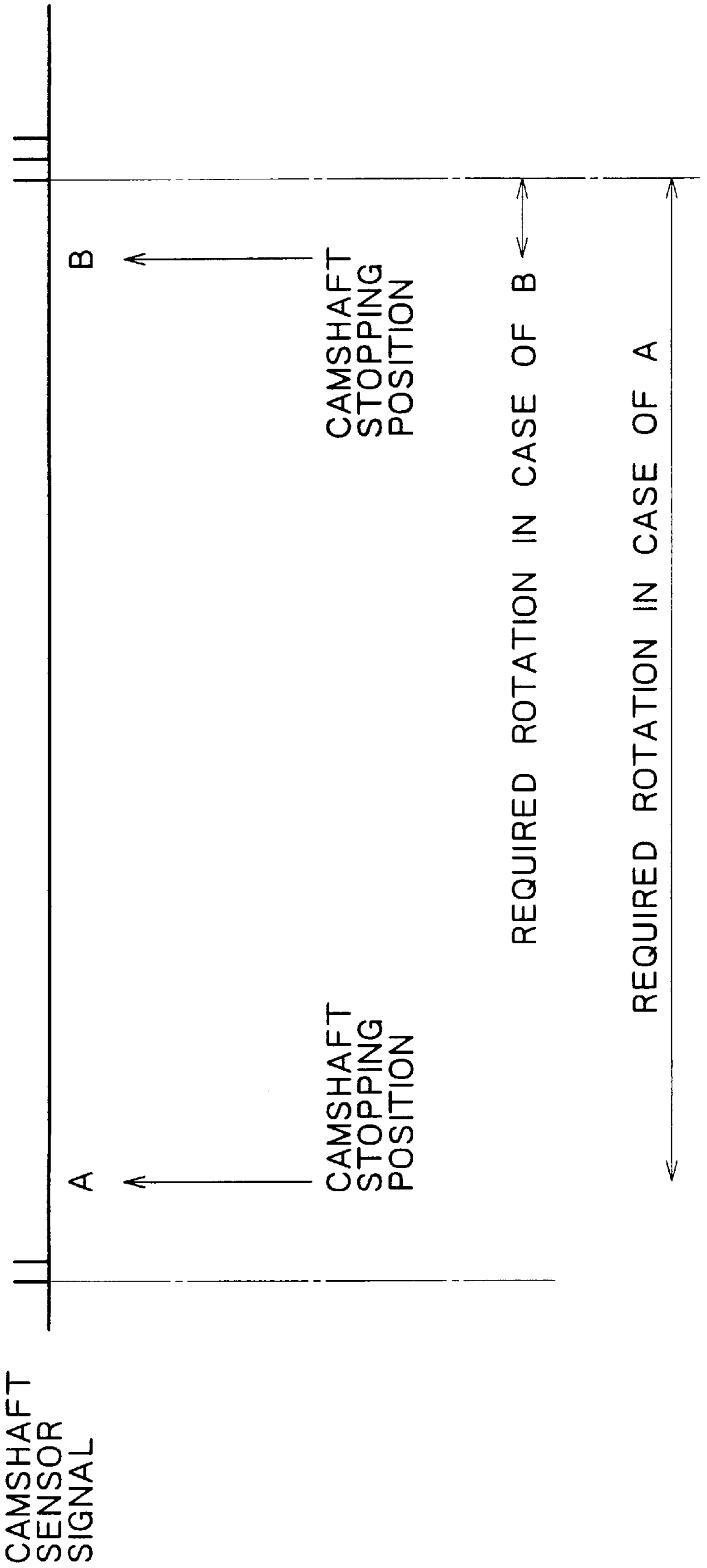
FIG. 21 is a diagrammatic view illustrating required amounts of rotation of a crankshaft to reach a reference position from different stopping positions of a camshaft.

This is described with reference to FIG. 21. Two cases wherein the top ones of signals of two signal groups including two signals and three signals from the left in FIG. 21 indicated as the camshaft sensor signal individually indicate reference positions and the crankshaft stops at positions A and B of FIG. 21 are described.

In particular, it is a request to start up the engine is received, then immediately after the driving motor starts to rotate the crankshaft, a reference position signal is outputted from the camshaft position sensor, and the control unit 17 can deliver fuel injection and ignition instructions in accordance with the cylinder recognition performed prior to the stopping of the engine based on the reference position recognition. In other words, fuel supply and ignition can be performed beginning with a first input of a camshaft reference position signal after starting of rotation of the crankshaft, and re-start-up of the engine is allowed in a short time.

In this manner, the method of operating the crankshaft stopping phase when the engine is stopped automatically may be the same as in the procedure described hereinabove with reference to FIG. 23. However, the crankshaft stopping position may be necessarily be the same between the case wherein the engine is stopped completely. In particular, since the background of the request is different in that the crankshaft stopping phase in the former case is a position forwardly of a reference position signal and the crankshaft stopping position in the latter case is a dynamically neutral point, the two phases may possibly be different from each other. Further, since the crankshaft phase forwardly of a reference position signal is not a dynamically neutral point, where the resistance against rotation of the crankshaft is low, in order to keep the crankshaft at the target phase, it is required to apply a driving force from the driving motor to block rotation of the crankshaft.

Figure 24:
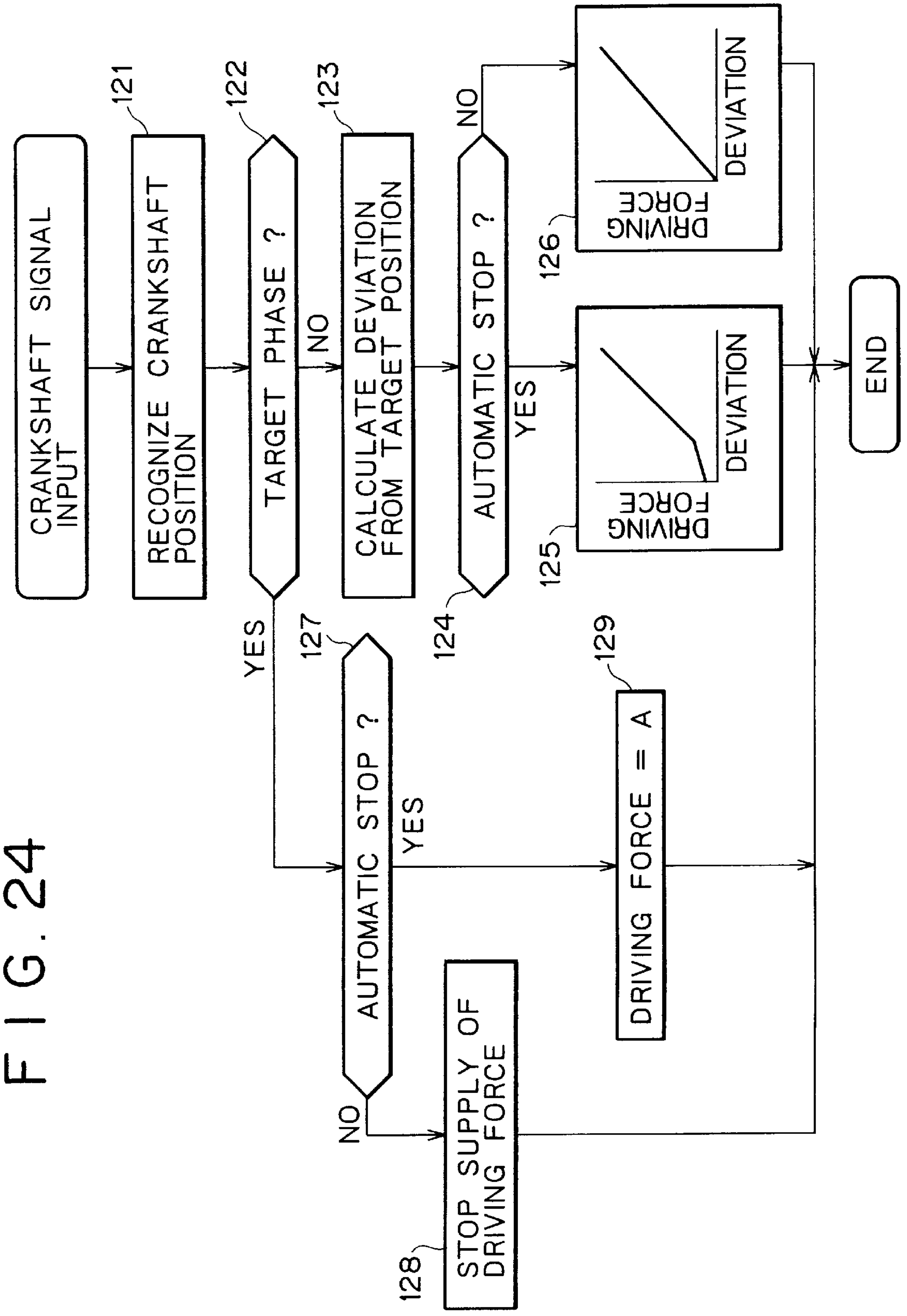

From the foregoing circumstances, an example of algorithm for driving motor control for both of automatic stopping of the engine and complete stopping of the engine is illustrated in FIG. 24. Referring to FIG. 24, while a starting condition of the routine and a flow of the algorithm are similar to those of FIG. 23, the routine includes additional stops 124 and 127 for providing different instruction values for the driving force between automatic stopping and complete stopping. Thus, depending upon results of the discrimination in steps 124 and 127, different driving forces when the crankshaft phase comes to a target value are applied in steps 128 and 129. In particular, upon automatic stopping, a driving force A necessary to keep the crankshaft at the target phase is applied, but upon complete stopping, supply of the driving force is stopped.

Similarly, also when the crankshaft does not reach a target phase, different driving forces are applied in steps 125 and 126. In particular, since the target crankshaft position is different: between automatic stopping and complete stopping, the driving force to be applied with a given deviation is different, and such driving forces suitable for automatic stopping and complete stopping are applied in steps 125 and 126, respectively.

Further, though not illustrated in FIG. 24, it is a matter of course that the target crankshaft phase is discriminated separately upon automatic stopping and upon complete stopping. From the foregoing, upon both of automatic stopping and complete stopping, the crankshaft phase can be stopped and maintained at a target phase. The position immediately prior to a reference position of the camshaft position sensor upon automatic stopping here is a position forwardly of the reference position determined taking a control accuracy when the crankshaft stopping phase is controlled to the reference position into consideration and may be a phase nearest to the reference position. More particularly, the position immediately prior to a reference position is, for example, such a phase as indicated by an arrow mark in FIG. 4.

Figure 5:
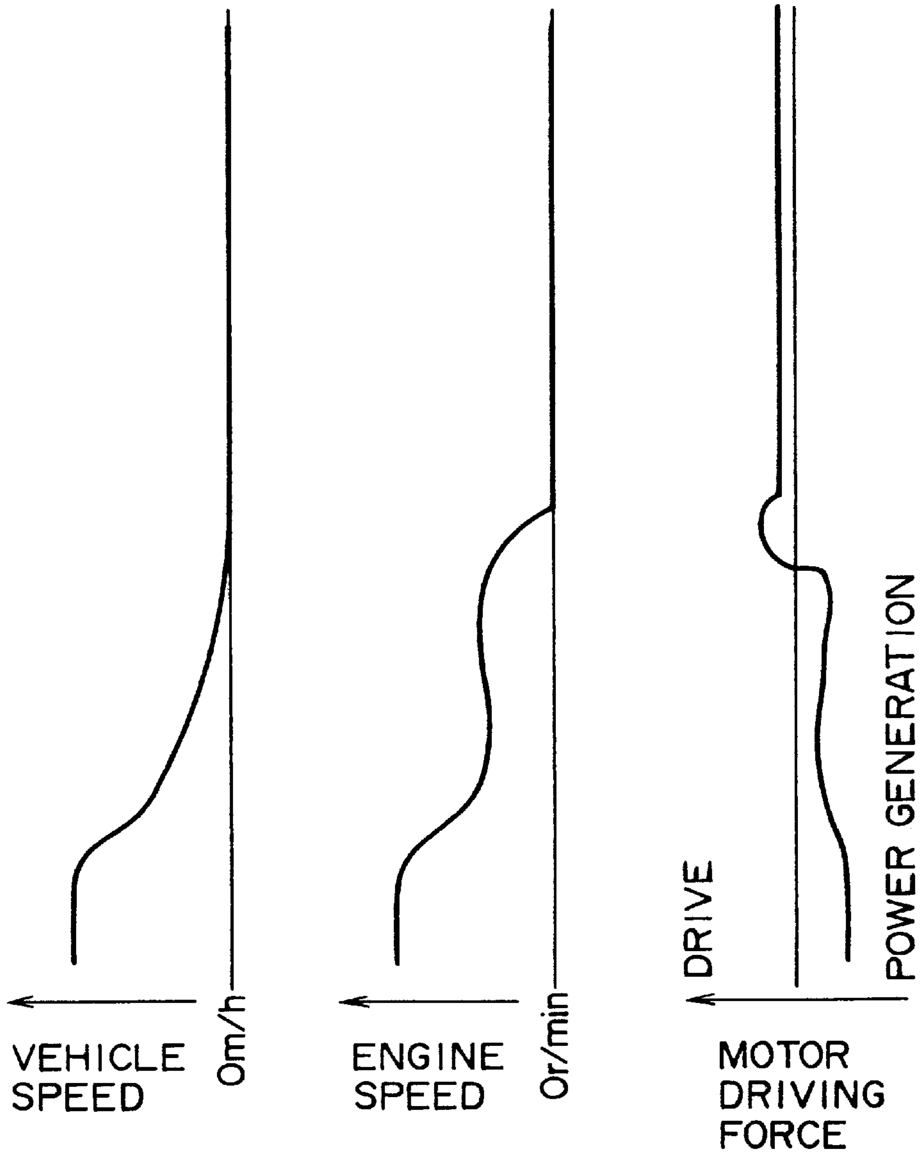
FIGS. 5 to 7 are diagrammatic views illustrating different control manners of the 4-cylinder engine of FIG. 2.

Actual conditions of driving force control of the driving motor in the algorithm described above are described below. FIG. 5 illustrates an example of such conditions when automatic stopping is performed. The vehicle decreases its speed from a condition wherein it is running at a predetermined vehicle speed until it stops. Thereupon, since the accelerator is not operated, the vehicle stops while the engine is rotating substantially at a speed equal to that upon idling. Before the vehicle stops, the driving motor receives power from the engine and generates electric power necessary for operation of the engine and electric power necessary for associated elements. Here, since the engine is in an idling state and the vehicle stops, the engine need not continue its idling. Therefore, discrimination of execution of automatic stopping is performed, and the engine is stopped. Consequently, the engine speed drops to 0. As the engine stops, in order to introduce the crankshaft to a target crankshaft phase as described with reference to FIG. 24 above, the driving motor enters a driving condition from the generating condition and starts operation of the crankshaft. In the present embodiment, in order to prevent sudden stopping of the engine from giving an unfamiliar feeling to the driver, a driving force is applied positively immediately after stopping of the engine to lower the engine speed smoothly. Accordingly, the driving force temporarily exhibits a high value and thereafter decreases as the target position is approached. After the crankshaft phase comes to a position immediately prior to the target camshaft signal reference position, the driving motor continues to output a fixed driving force necessary to keep the crankshaft at the target phase and stands by in this state for next start-up of the engine.

Figure 6:
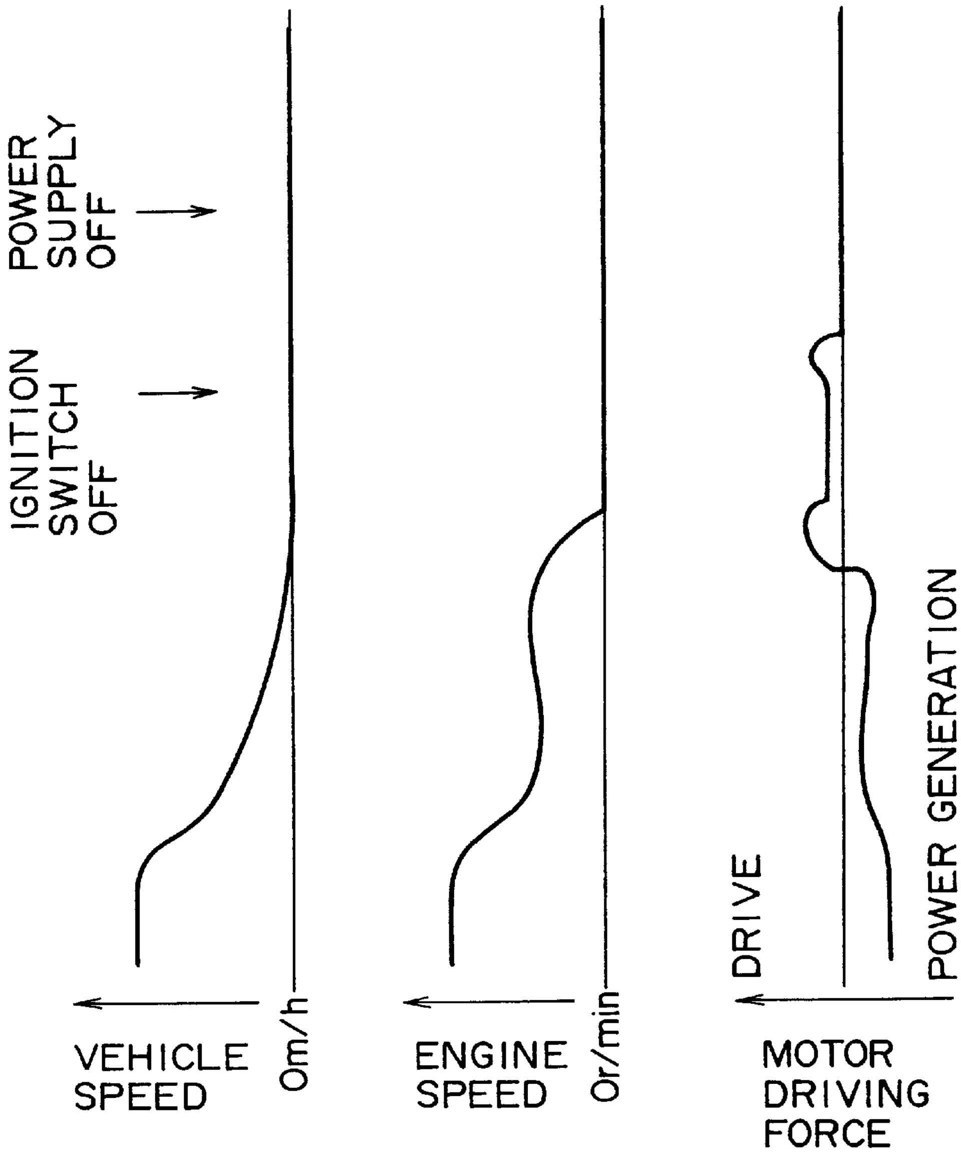

FIG. 6 illustrates another example of actual conditions of driving force control of the driving motor when the vehicle is stopped from a condition wherein it is running at a predetermined vehicle speed and then the ignition switch is switched off to cause the engine to stop completely. The vehicle speed, engine speed and motor driving force exhibit similar variations to those illustrated in FIG. 5 till the point of time indicated by an arrow mark in FIG. 7, that is, till the ignition switch is switched off. When the ignition switch is switched off, the control mode changes from the automatic stopping mode to the complete stopping mode. Consequently, the target crankshaft phase is changed over from the position immediately prior to the reference position to a dynamically neutral point, and in order to rotate the crankshaft to the new target phase, the mater driving force is increased. Then, when the dynamically neutral point as the new target phase is reached, the driving force is reduced to zero. Thereafter, a timing at which power supply should be interrupted is determined, and at the timing thus determined, power supply to the control unit 17 is interrupted to stop the operation of the system completely.

Figure 7:
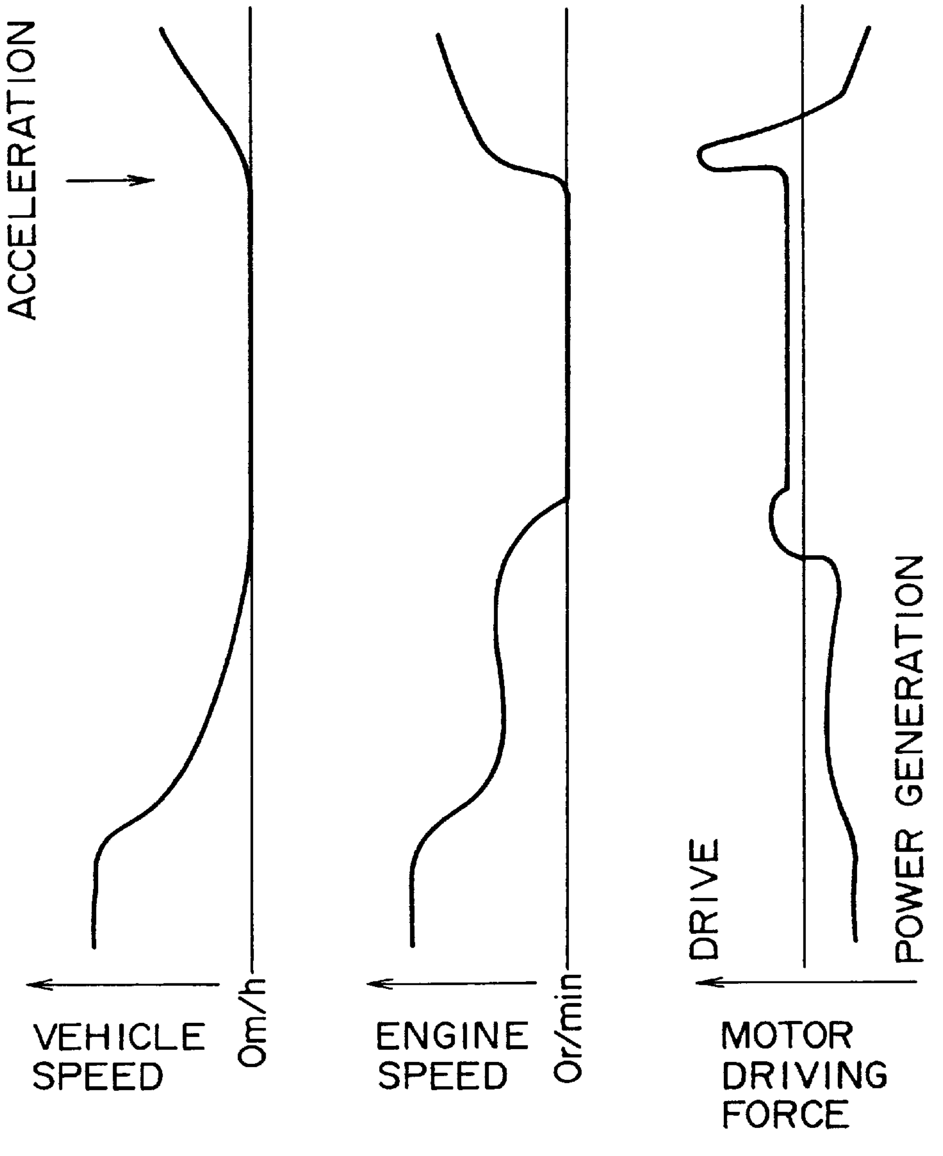

FIG. 7 illustrates an example of actual conditions of driving force control of the driving motor when the engine is started up in response to an operation of the accelerator by the driver after the engine is automatically stopped. The vehicle speed, engine speed and motor driving force exhibit similar variations to those illustrated in FIG. 5 until the engine is stopped and keeping of the crankshaft phase is started. However, at a point of time indicated by an arrow mark in FIG. 7 after then, an acceleration instruction is generated by an operation of the accelerator by the driver. In response to the acceleration instruction, the driving motor provides rotation to the crankshaft with a high driving force to start up the engine. In this instance, since the phase at which the crankshaft stops is the position immediately prior to a camshaft signal reference position, a camshaft signal can be outputted immediately after the rotation of the crankshaft is started. Further, since the strokes of the cylinders are recognized in advance, fuel supply and ignition can be performed rapidly. When the engine enters a self-operated rotation condition as a result of the fuel supply and ignition, the driving motor enters a power generation condition, in which it generates electric power with the power from the engine. Thereafter, the vehicle speed increases with the output power of the engine in response to an acceleration instruction.

Figure 13:
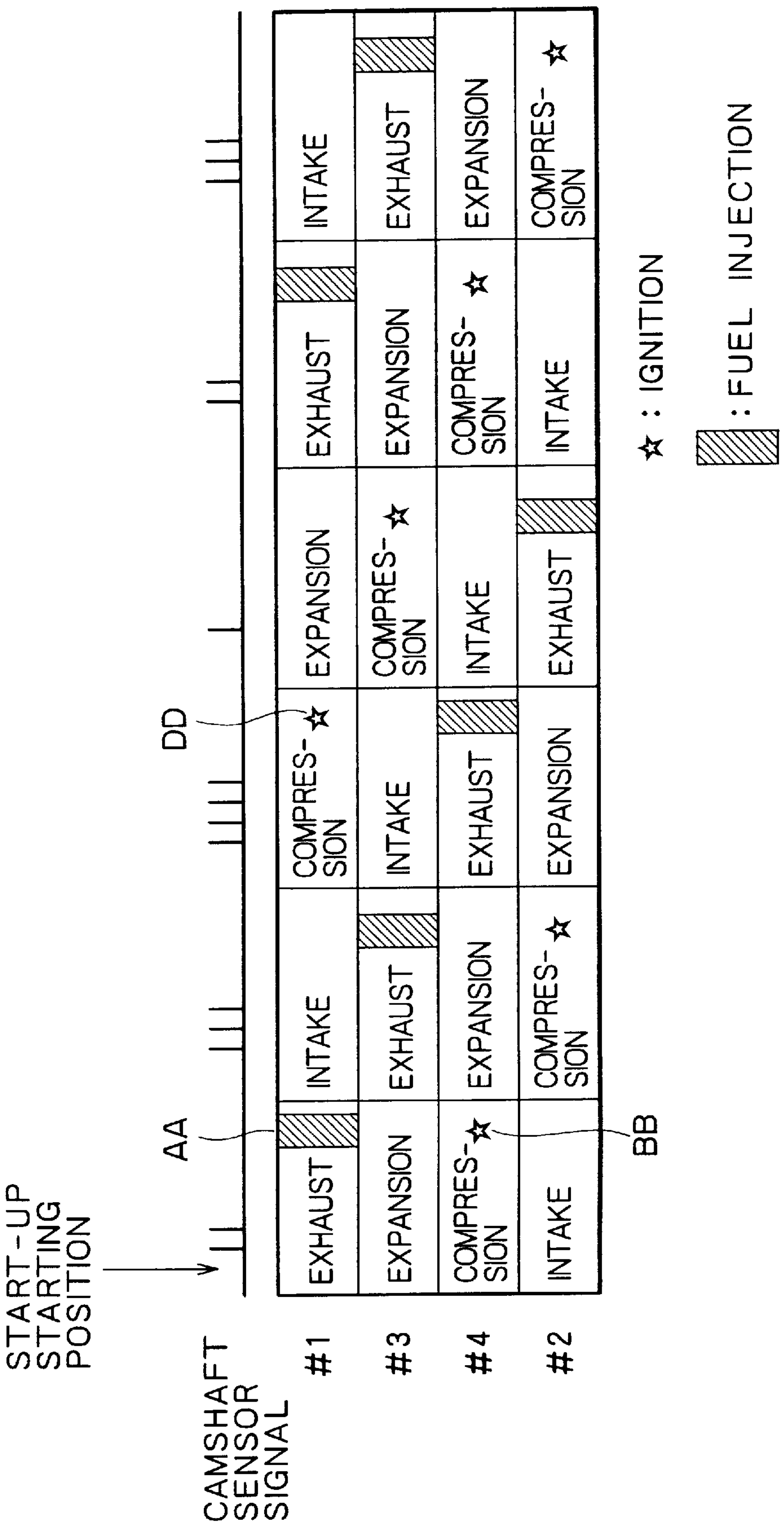
FIG. 13 is a similar view but illustrating a control manner of the 4-cylinder engine of FIG. 2 which corresponds to the control manner illustrated in FIG. 12.

Detailed manners of the strokes of the cylinders upon such operations as described above are described below. FIG. 13 illustrates strokes of cylinders of a 4-cylinder engine and behaviors for fuel supply and injection upon start-up of the engine in the foregoing description. Start-up of the engine is started from a position indicated by an arrow mark in FIG. 13. Immediately after the start-up, a reference position is recognized from a camshaft sensor signal recognized first, and fuel injection AA is performed for the #1 cylinder which is in the exhaust stroke based on the recognition while ignition BB is performed for the #4 cylinder which is in the compression stroke. The ignition BE does not cause explosion because no fuel is supplied into the cylinder. From a similar reason, first explosion is caused by ignition DD by which the fuel having been injected by the fuel injection AA is ignited in the #1 cylinder.

Figure 12:
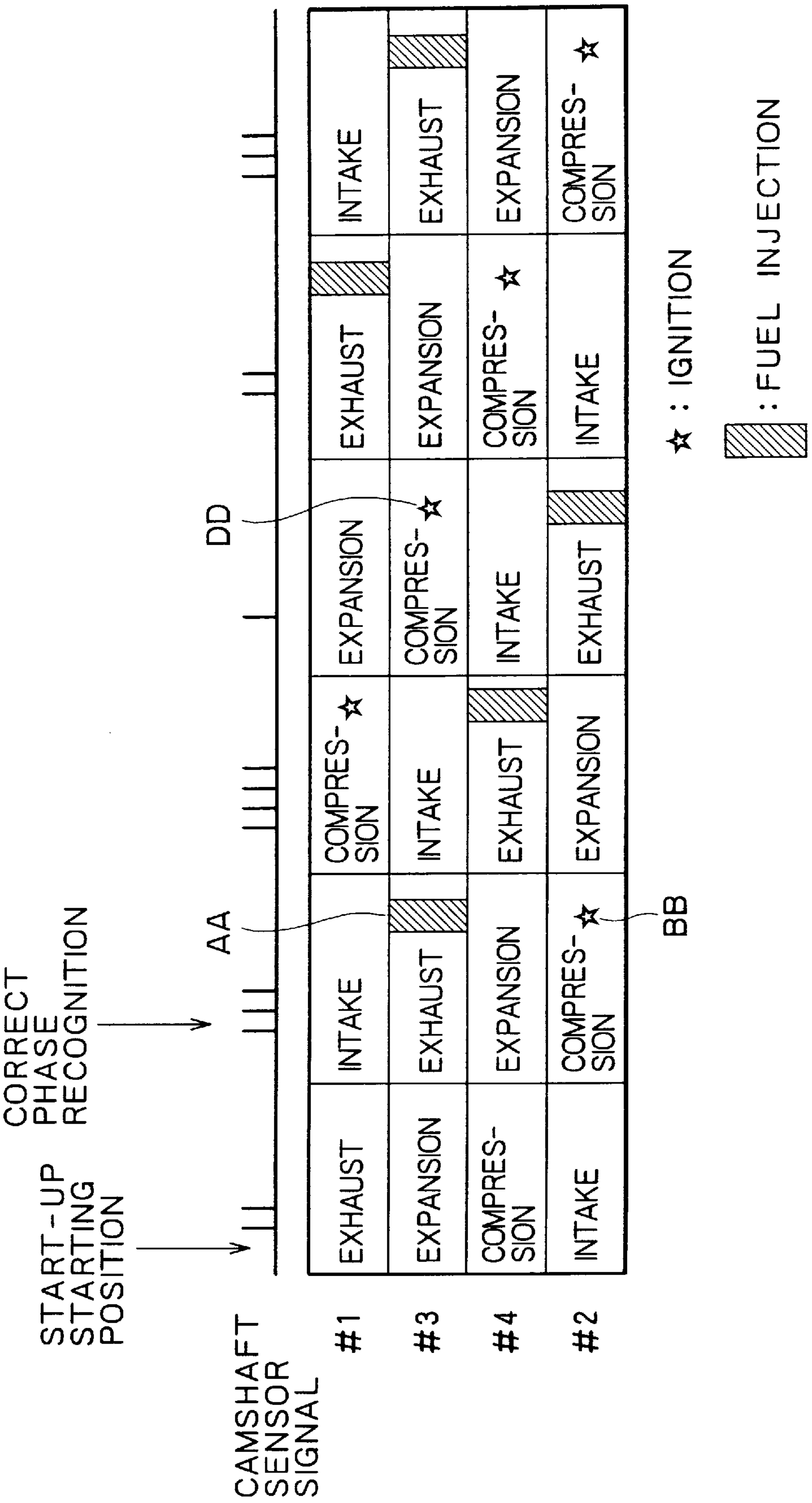
FIG. 12 is a similar view but illustrating a control manner of a 4-cylinder engine in which the control apparatus for an engine driving motor according to the present invention is not incorporated.

This is compared with an alternative case wherein the present invention is not applied. FIG. 12 illustrates behaviors upon start-up similarly to FIG. 13. Referring to FIG. 12, the crankshaft starts rotation from its start-up starting position, and strokes of the cylinders at the position of correct phase recognition in FIG. 12 are recognized. Based on the recognition, fuel injection AA is performed for the #3 cylinder which is in the intake stroke, and ignition BB is performed for the #2 cylinder which is in the compression stroke. In this instance, first explosion is caused by ignition DD by which the fuel having been injected by the fuel injection AA is ignited in the #3 cylinder. Here, it can be seen from comparison between FIGS. 13 and 12 that the first explosion in FIG. 13 occurs earlier by one cylinder interval than that in FIG. 12 after the start-up of the engine, and the control illustrated in FIG. 13 allows earlier self-operated rotation of the engine.

Figure 9:
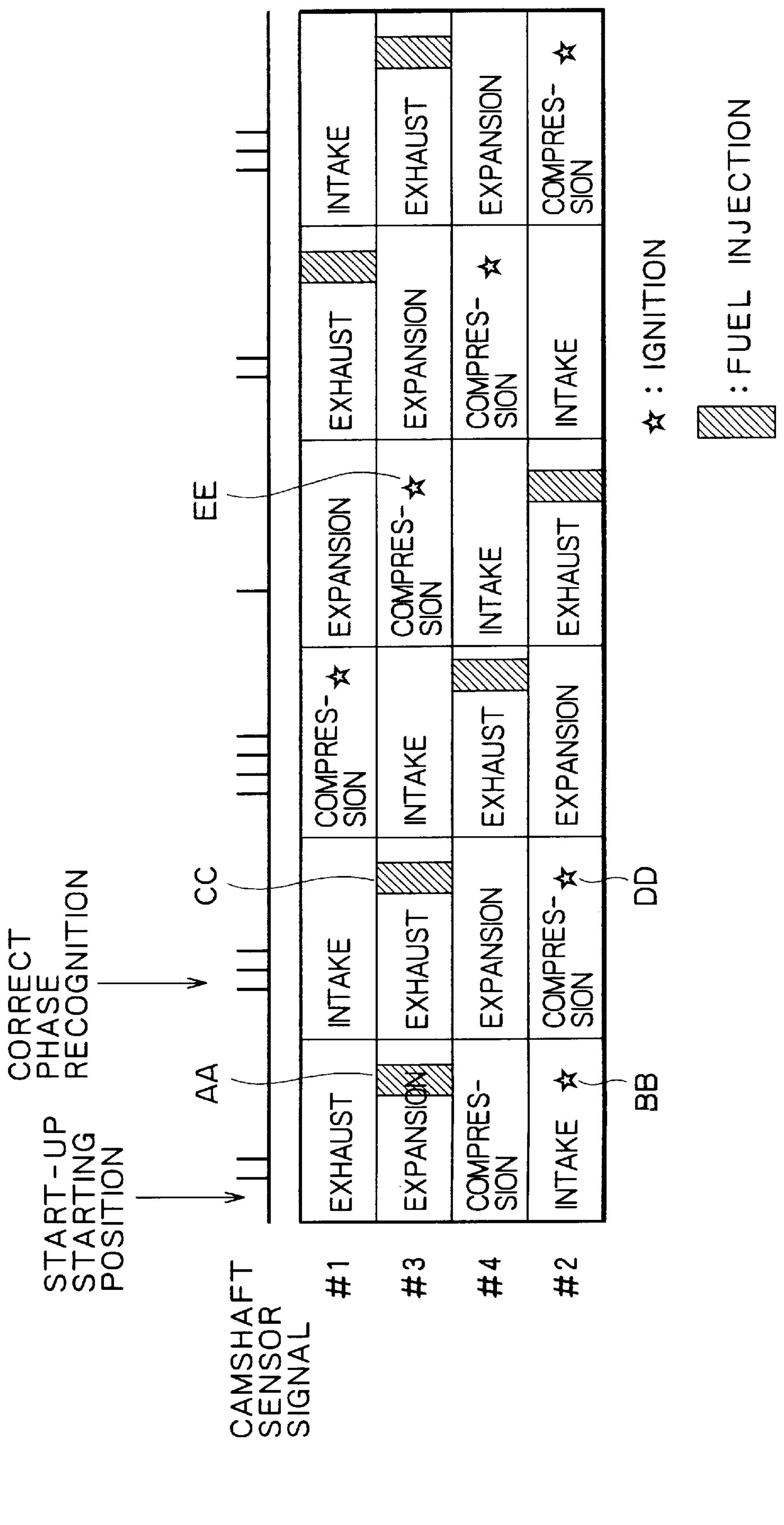
FIGS. 9 to 11 are diagrammatic views similar to FIG. 4 but illustrating different control manners of the 4-cylinder engine of FIG. 2.

The foregoing description presupposes that fuel injection and ignition are performed based on estimated strokes of the cylinders when the engine is started up. However, for example, if the crankshaft is rotated by an external force while the engine stops completely, then the estimated strokes of the cylinders may nor necessarily be correct. Accordingly, fuel injection and ignition based on the estimated stroke recognition of the cylinders may possibly be performed in wrong cylinders. An example of this case is illustrated in FIG. 9. FIG. 9 illustrates an example wherein the control unit 17 recognizes in error that, when the #1 cylinder should originally be in the exhaust stroke in the same conditions as in FIG. 13, the #3 cylinder is in the exhaust stroke because the crankshaft has been rotated by an external force or the like during stopping of the engine.

Immediately after start-up of the engine, a reference position is recognized from a camshaft sensor signal recognized first, and fuel injection AA is performed for the #3 cylinder which is recognized as being in the exhaust stroke in error based on the recognition and ignition BB is performed for the #4 cylinder which is recognited as being in the compression stroke in error. Although the ignition BB is performed for the 114 cylinder which actually is in the intake stroke, since no fuel has been supplied into the #4 cylinder, the ignition BB does not cause explosion. Then, at a position indicated by another (right side one) arrow mark in FIG. 9, the control unit 17 recognizes correct stroke phases of the individual cylinders. Accordingly, fuel injection and ignition can thereafter be performed for those cylinders at which such fuel injection and ignition should be performed based on correct stroke recognition. Here, if attention is paid to the #3 cylinder, fuel injection based on correct stroke recognition should be performed at a point CC of time. However, fuel has already been supplied at the point AA of time and exists in the intake port. Therefore, if fuel injection is performed again at the point CC of time, then fuel of an amount equal to twice the required amount is supplied totally and an excessively high air fuel ratio is reached. Consequently, even if injection is performed at a point EE of time, then misfire will occur. Therefore, at the timing CC shown in FIG. 9, fuel injection should not be performed. This allows ignition to be performed at the timing EE to obtain correct explosion.

Figure 10:
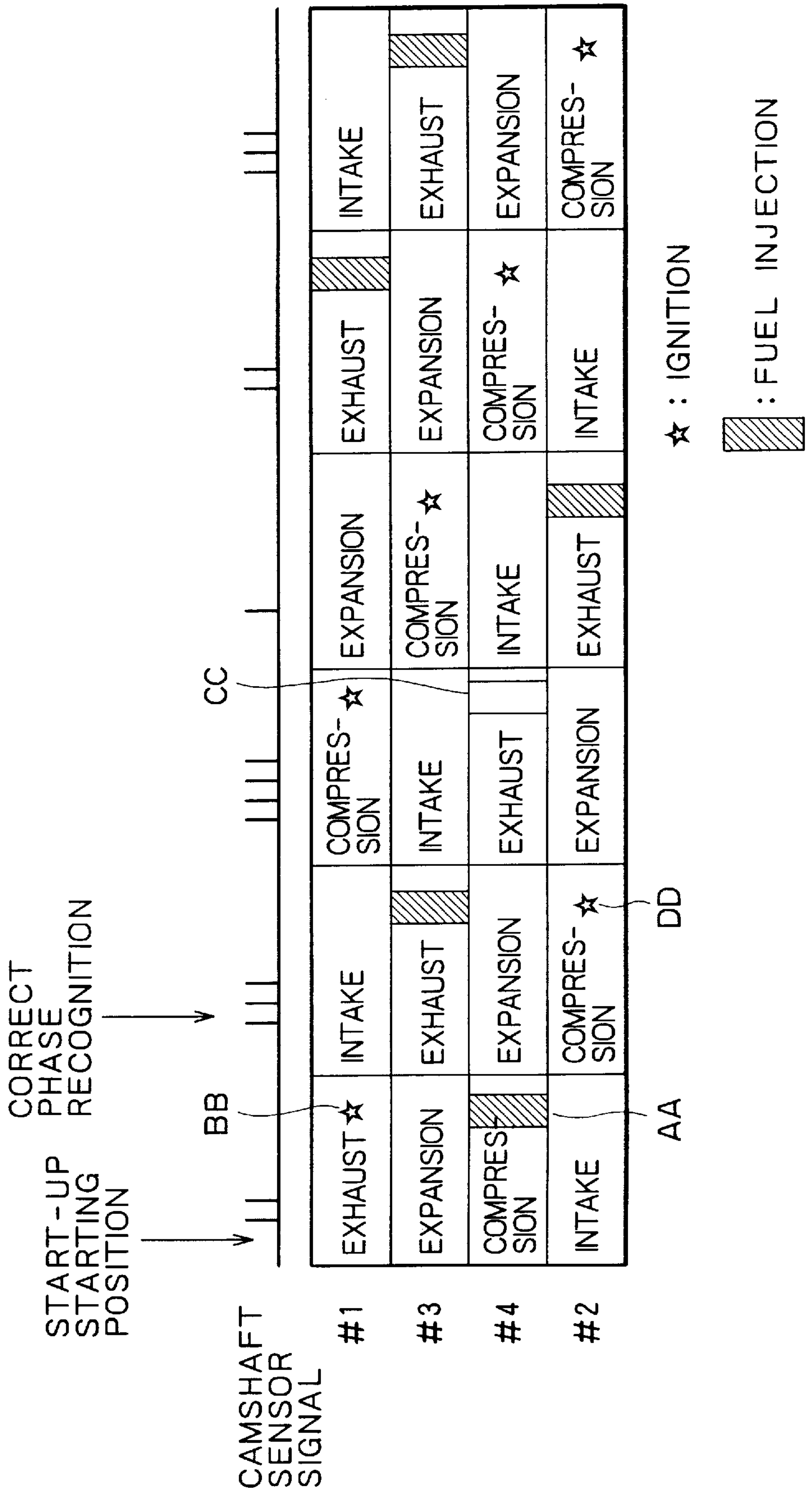

FIG. 10 similarly illustrates an example wherein the control unit 17 recognizes in error that, when the #1 cylinder should originally be in the exhaust stroke in the same conditions as in FIG. 13, the #4 cylinder is in the exhaust stroke.

Immediately after start-up of the engine, a reference position is recognized from a camshaft sensor signal recognized first, and fuel injection AA is performed for the #4 cylinder which is recognized as being in the exhaust stroke in error based on the recognition and ignition BB is performed for the #1 cylinder which is recognized as being in the compression stroke in error. Although the ignition BB is performed for the #1 cylinder which actually is in the exhaust stroke, since no fuel has been supplied into the #1 cylinder, the ignition BB does not cause explosion. Then, at a position indicated by another (right side one) arrow mark in FIG. 10, the control unit 17 recognizes correct stroke phases of the individual cylinders.

Here, if attention is paid to the #4 cylinder, fuel injection based on correct stroke recognition should be performed at a point CC of time. However, fuel has already been supplied at the point AA of time and exists in the intake port. Therefore, if fuel injection is performed again at the point CC of time, then even if injection is performed at a point EE of time, misfire will occur from a similar reason to that described hereinabove with reference to FIG. 9. Therefore, at the timing CC shown in FIG. 10, fuel injection should not be performed. This allows ignition to be performed at the timing EE to obtain correct explosion.

Figure 11:
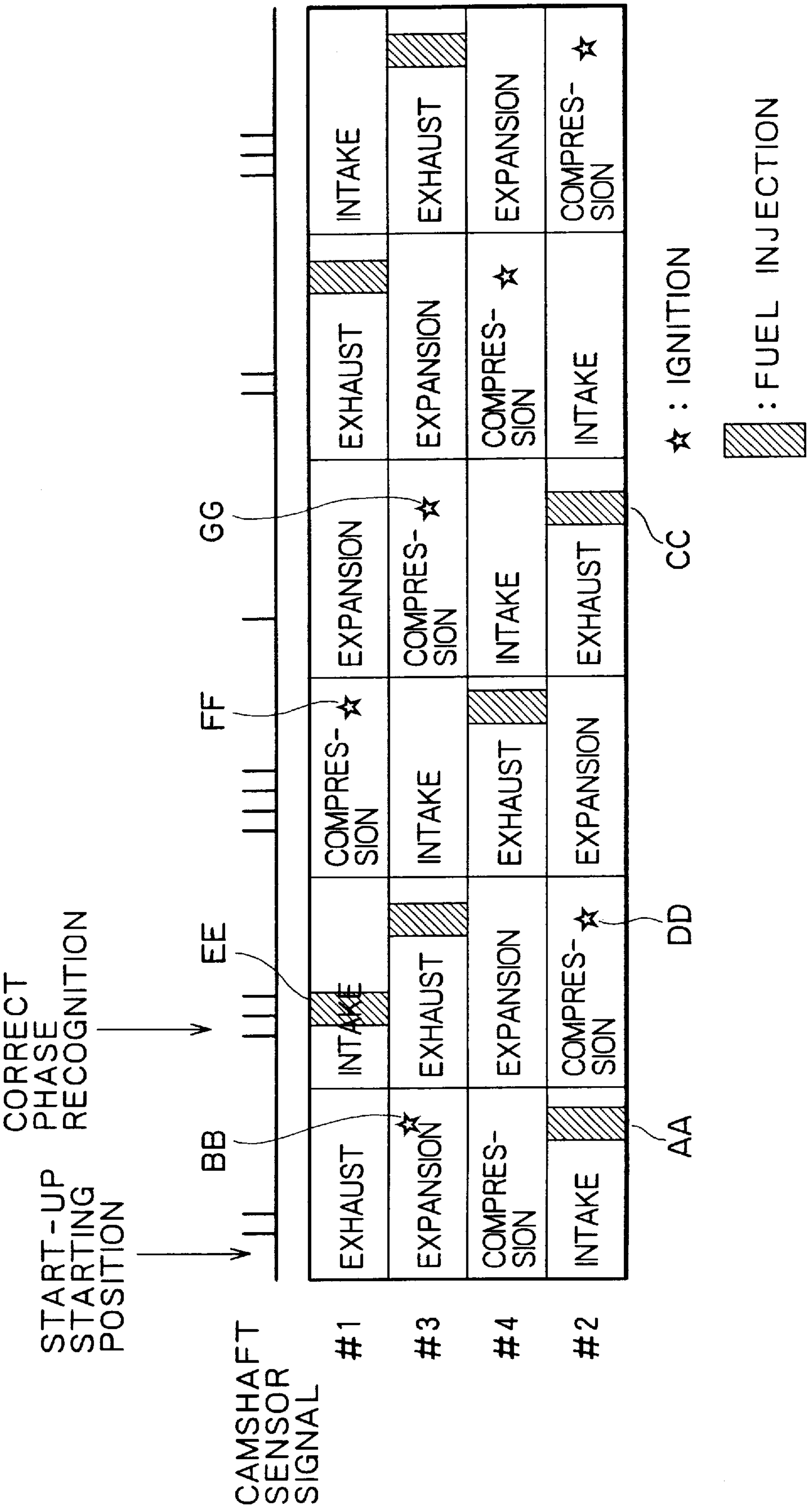

FIG. 11 similarly illustrates an example wherein the control unit 17 recognizes in error that, when the #1 cylinder should originally be in the exhaust stroke in the same conditions as in FIG. 13, the #2 cylinder is in the exhaust stroke.

Immediately after start-up of the engine, a reference position is recognized from a camshaft sensor signal recognized first, and fuel injection AA is performed for the #2 cylinder which is recognized as being in the exhaust stroke in error based on the recognition and ignition BB is performed for the #3 cylinder which is recognized as being in the compression stroke in error. Although the ignition BB is performed for the #3 cylinder which actually is in the exhaust stroke, since no fuel has been supplied into the #3 cylinder, the ignition BB does not cause a explosion. Then, at a position indicated by another (right side one) arrow mark in FIG. 11, the control unit 17 recognizes correct stroke phases of the individual cylinders.

Here, if attention is paid to the #2 cylinder, fuel injection based on correct stroke recognition should be performed at a point CC of time. However, fuel having already been supplied at the point AA of time is directly taken into the cylinder through the port because the intake valve is open. Therefore, different from the cases described hereinabove with reference to FIGS. 9 and 10, even if fuel injection is performed based on correct stroke recognition, the fuel supply amount does not become excessive in any of the cylinders. Further, ignition which is performed at a point DD of time can cause explosion with the fuel having been injected at the timing AA. On the other hand, if attention is paid to the #1 cylinder, although a timing EE is not a regular fuel injection timing, if fuel injection is performed at the timing FF for the cylinder which is in the intake stroke at a point of time when the correct stroke recognition is performed, then explosion is caused by ignition at the timing FF from a reason similar to that upon fuel injection at the timing AA. Since the fuel having been injected by the fuel injection AA based on the erroneous stroke recognition is exploded by the ignition DD, fuel injection can be performed at the timing EE and explosion can be obtained by the ignition at the timing FF. Thus, a first explosion GG by fuel injection and ignition based on the correct stroke recognition can be obtained successively.

Figure 18:
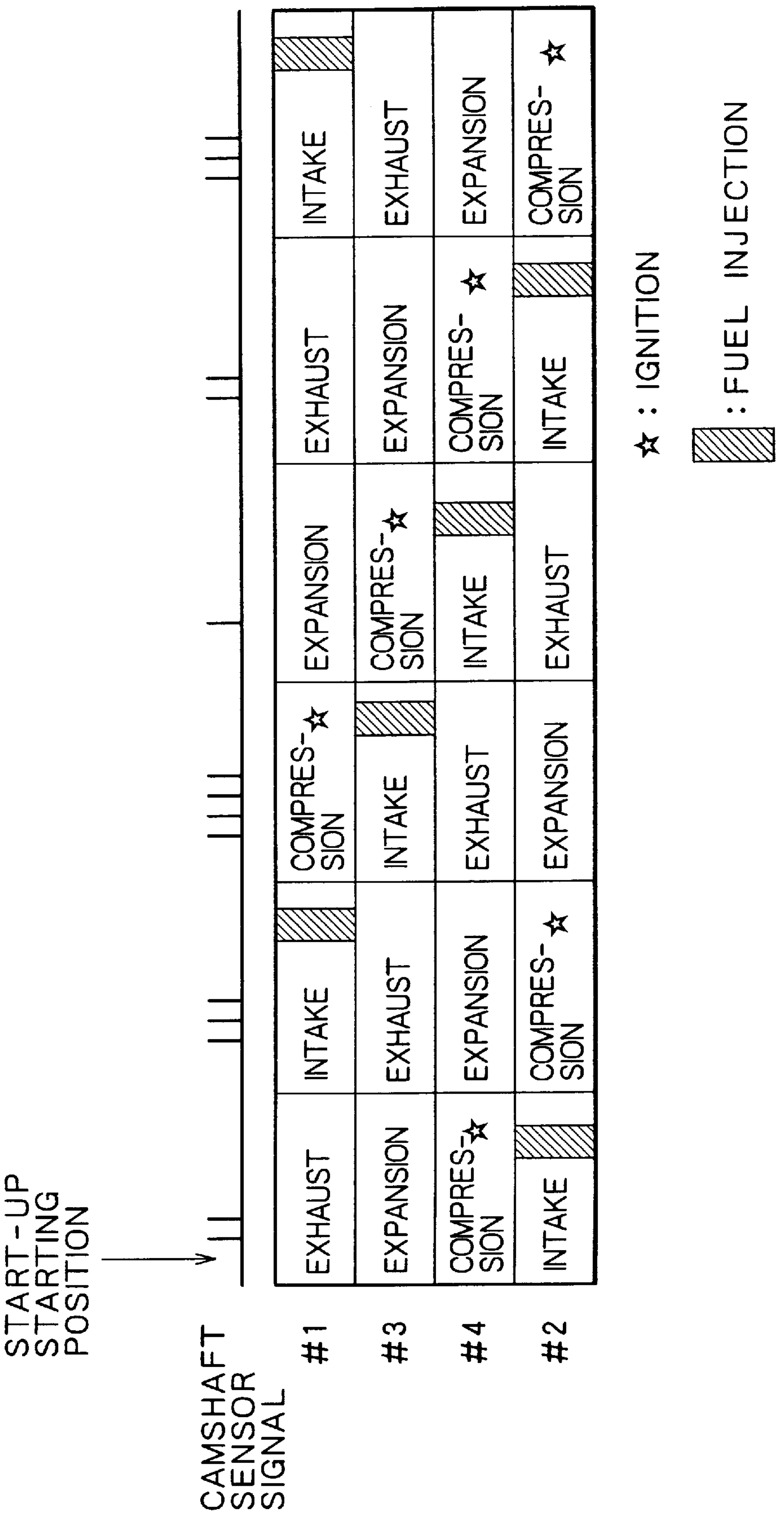
FIG. 18 is a similar view but illustrating a different control manner of the 4-cylinder engine of FIG. 2.

In the example described above with reference to FIG. 11, as a result of the fact that the strokes of the cylinders are recognized in error, first explosion is obtained at a timing earlier by one cylinder interval than that when the strokes of the cylinders are recognized correctly. This, however, is a phenomenon which appears because fuel injection in an intake stroke which should originally be performed from the circumstances of a combustion condition is performed. Where it is set that fuel injection should originally be performed in the exhaust stroke from the circumstances of a combustion condition, when the engine is started up with estimated values of correct stroke recognition, the engine performs such a behavior as illustrated in FIG. 18, and though not shown, the situation that first explosion occurs in an earlier stage as a result of such erroneous stroke recognition as described herein above with reference to FIG. 11 does not occur. Further, though not shown, if estimated values of stroke recognition are wrong, though not shown, a method of regulating the amount of fuel to be supplied to a cylinder in accordance with such a concept as described hereinabove with reference to FIGS. 9 and 10 can be specified from a manner in which the estimated values are wrong, and an execution method for fuel injection suitable for the method can be specified.

While, in the foregoing description, fuel injected into an intake port is sucked into the cylinder in an equal amount irrespective of the injection timing, strictly speaking, the behavior of the fuel in the intake port is different depending upon the injection timing. Consequently, the amount of fuel taken into the cylinder is different depending upon the injection timing. Therefore, when the amount of fuel injected based on wrong stroke recognition to be taken into the cylinder is smaller than the amount of fuel injected based on correct stroke recognition, in place of stopping fuel injection at the timing CC of FIGS. 9 or 10, only an amount of fuel equal to the amount of the shortage should be injected.

By the operation described above, even if fuel injection is performed based on wrong estimated stroke recognition, the engine of the intake post injection type can be started up without causing surplus fuel supply.

Figure 20:
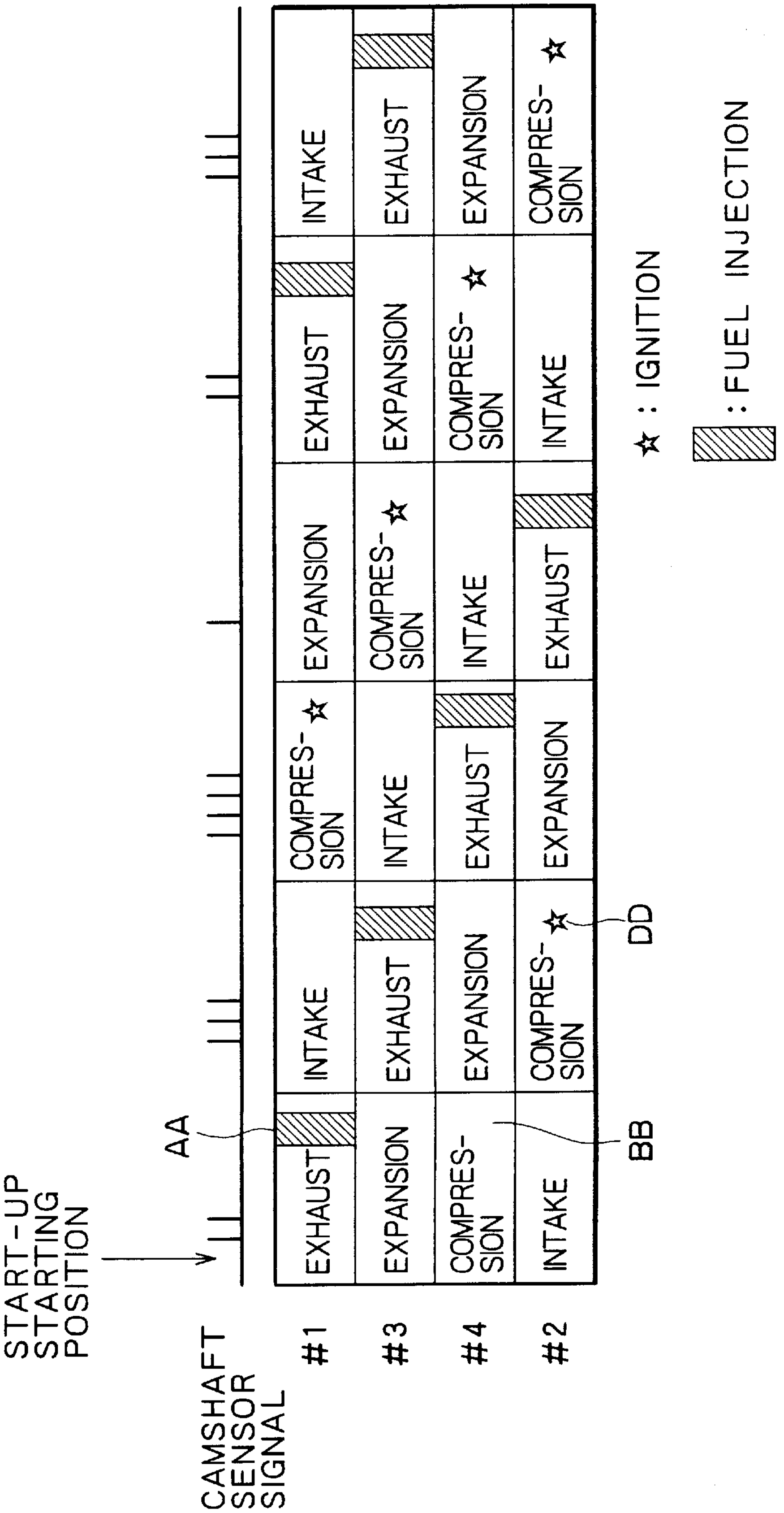
FIG. 20 is a diagrammatic view similar to FIG. 13 but illustrating a different control manner of the 4-cylinder engine of FIG. 2.

Further, even if such ignition BB as described hereinabove with reference to FIG. 13 is performed, it does not cause explosion because no fuel is present in the cylinder. However, if the preceding combustion has not been performed regularly from some reason and some fuel remains in the cylinder, explosion may possibly occur. On the other hand, if same fuel remains in the #2 cylinder in the case of FIG. 9, explosion which should not originally occur may possibly be caused by ignition at the timing BB, and flame may possibly go back into the intake pipe through the intake valve in an open condition, thereby causing back fire. Therefore, if ignition is prevented from being performed when estimated values based on stroke recognition are used as seen in FIG. 20, then explosion which should not originally occur can be prevented from occurring. Further, the condition wherein no fuel is present in a cylinder is a condition which is originally intended by the control, and in this instance, there is no problem even if ignition it not performed because no explosion occurs in the condition. In particular, in FIG. 20, ignition which is performed at the timing BB in FIG. 13 is not performed, but first ignition after starting of start-up of the engine is performed at the timing DD at which stroke recognition is completed with a signal of the camshaft sensor.

Figure 19:
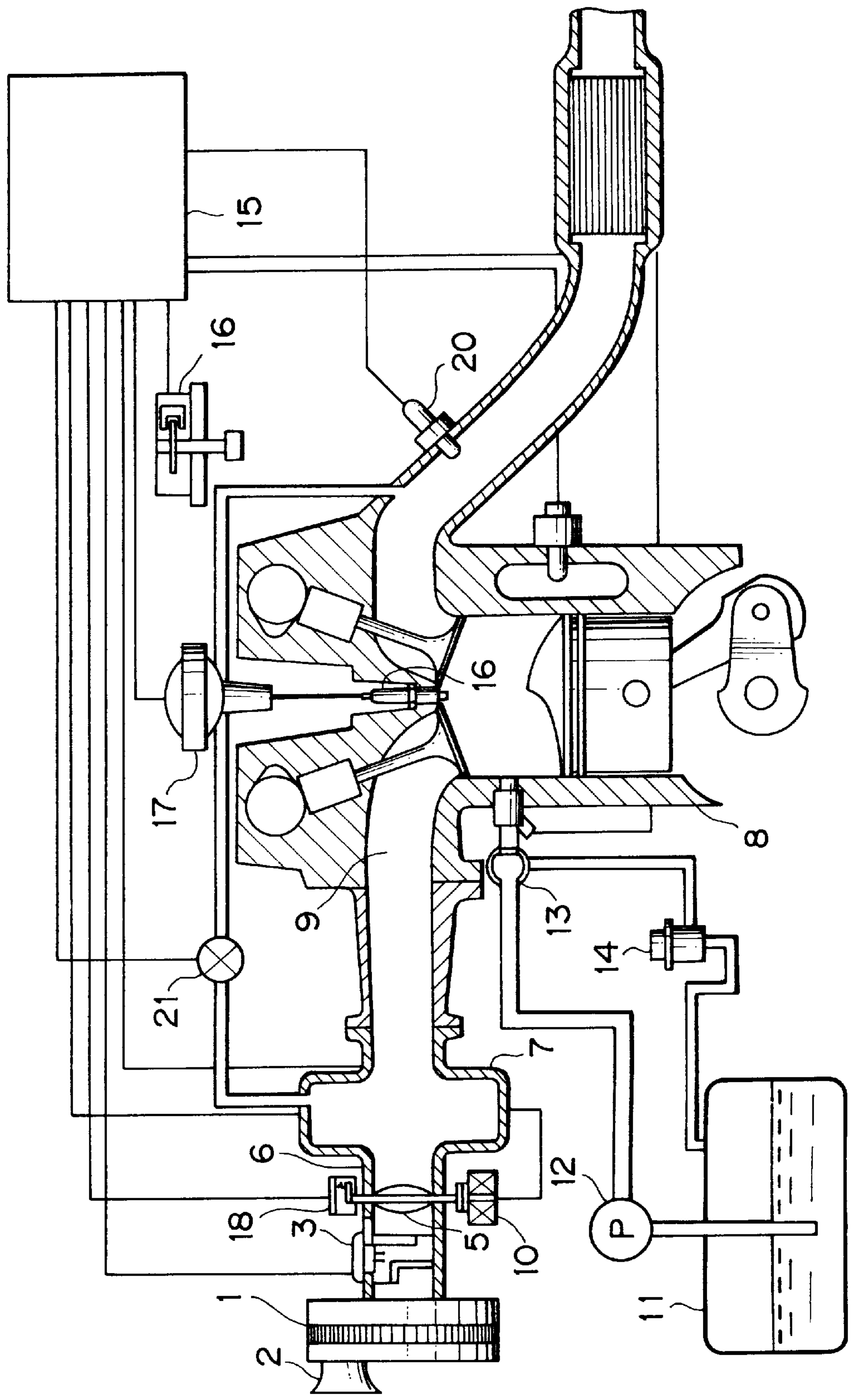
FIG. 19 is a schematic diagrammatic view showing a 4-cylinder engine formed as an in-cylinder fuel injection engine in which the control apparatus for an engine driving motor according to the present invention is incorporated.

An in-cylinder fuel injection engine is known as an engine whose fuel injection form is characteristically different from that of an engine wherein fuel injection is performed into an intake port. A general construction of the in-cylinder fuel injection engine is shown in FIG. 19. Referring to FIG. 19, the in-cylinder fuel injection engine is characterized in that the fuel injection port of the injector 13 is opened to the inside of the cylinder and fuel is injected into the cylinder while, in the intake port fuel injection engine of FIG 3, fuel is injected into the fuel port by the injector 13. Accordingly, fuel injection is performed in the intake stroke or the compression stroke 50 that the injected fuel may be burned in the rear half of the compression stroke. If fuel injection is performed in the intake stroke, then the time in which the injected fuel diffuses in the cylinder before the rear half of the compression stroke and uniform combustion can be performed in the cylinder, but if injection is performed in the compression stroke, then no sufficient time is assured for the injected fuel to diffuse. Here, if fuel distributed locally in the cylinder is operated so as to be introduced to the proximity of the ignition plug 16 and is then ignited, then since a air fuel ratio which is good for combustion call be produced locally, good combustion can be performed while combustion with a lean air fuel ratio can be performed in the entire cylinder. Generally, where requirements for achieving good combustion cannot be satisfied readily as upon start-up of the engine, good combustion cannot be achieved readily by injection in the compression stroke. On the other hand, since requirements for achieving combustion with injection in the intake stroke are less severe than those with injection in the compression stroke, upon start-up of the engine, fuel injection is preferably performed in the intake stroke.

Figure 14:
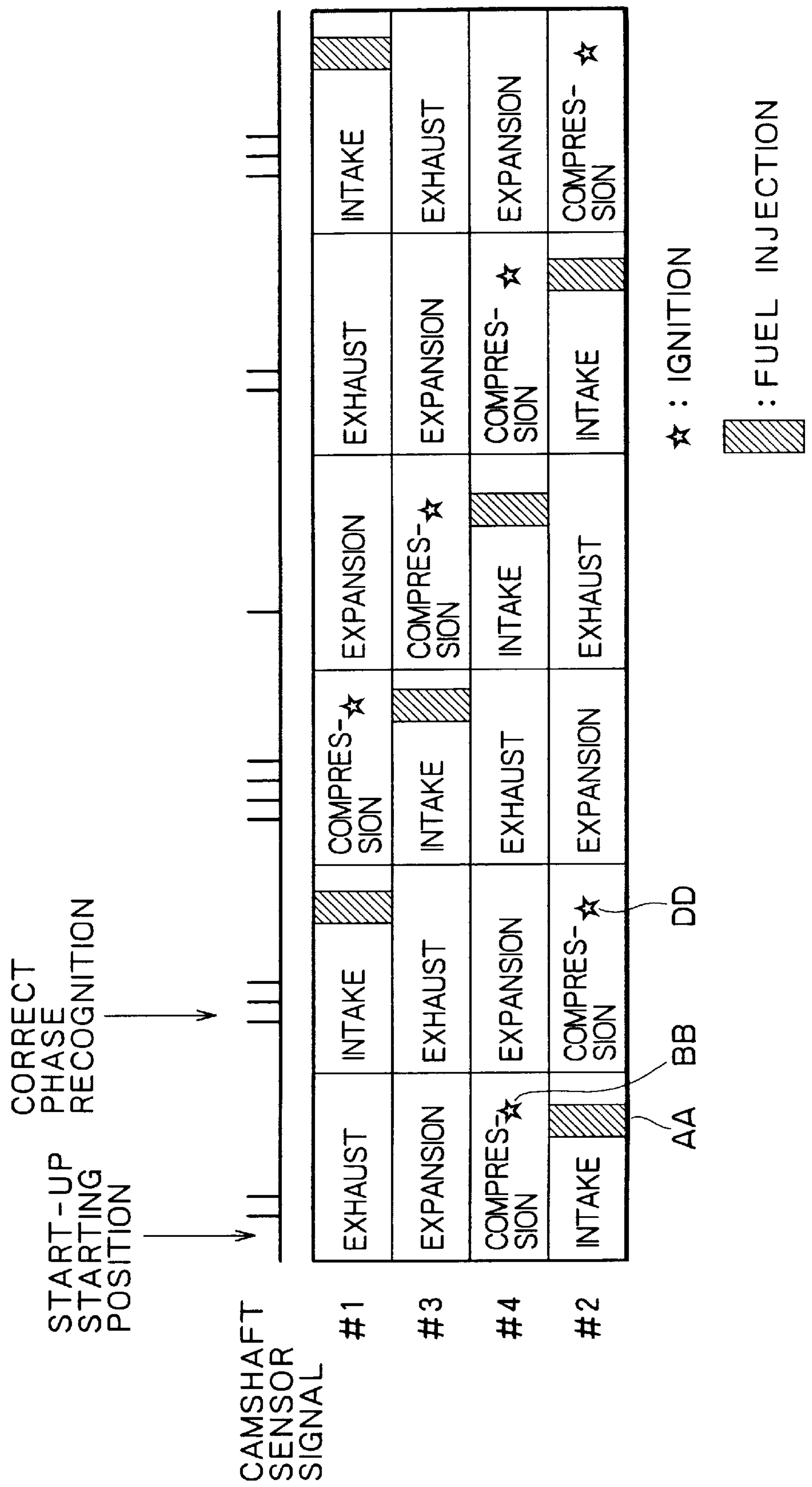
FIG. 14 is a similar view but illustrating a control manner of a 4-cylinder engine formed as an in-cylinder fuel injection engine in which the control apparatus for an engine driving motor according to the present invention is incorporated.

A method of performing fuel injection and ignition by which similar effects to those achieved by an intake port injection engine upon such start-up of the engine as described above can be achieved by the engine just described is illustrated in FIG. 14. First fuel injection after start-up of the engine is started is performed at a timing AA for the #2 cylinder which is in the intake stroke, and first explosion is caused by ignition at another timing DD. Accordingly, explosion can be obtained earlier by one cylinder interval than that when fuel injection and ignition are started after stroke recognition of the cylinders based on an input of a camshaft sensor signal. This is similar to that of an intake port fuel injection engine.

Figure 15:
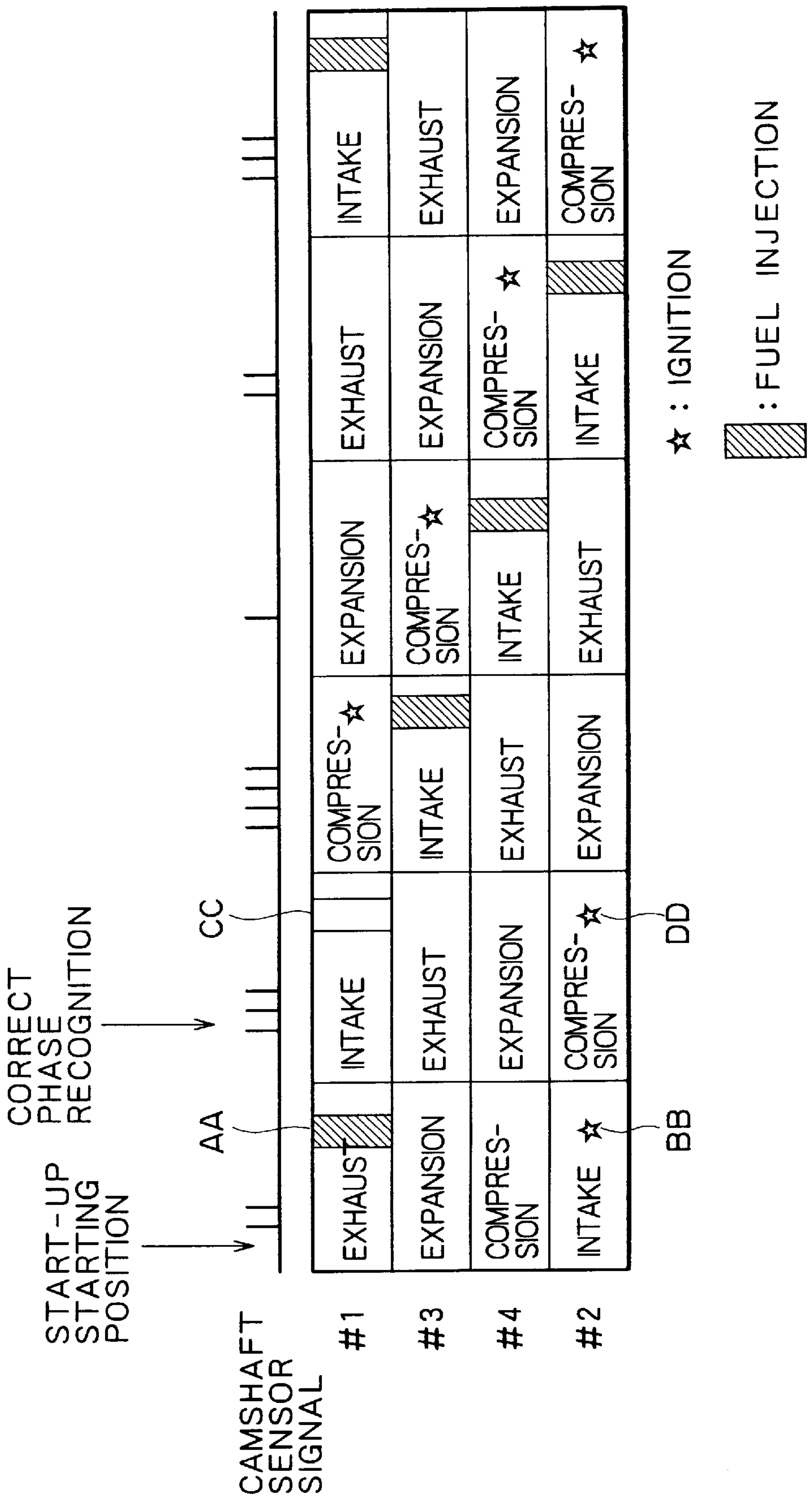
FIGS. 15 to 17 are similar views but illustrating different control manners of the 4-cylinder engine formed as an in-cylinder fuel injection engine in which the control apparatus for an engine driving motor according to the present invention is incorporated.
Figure 16:
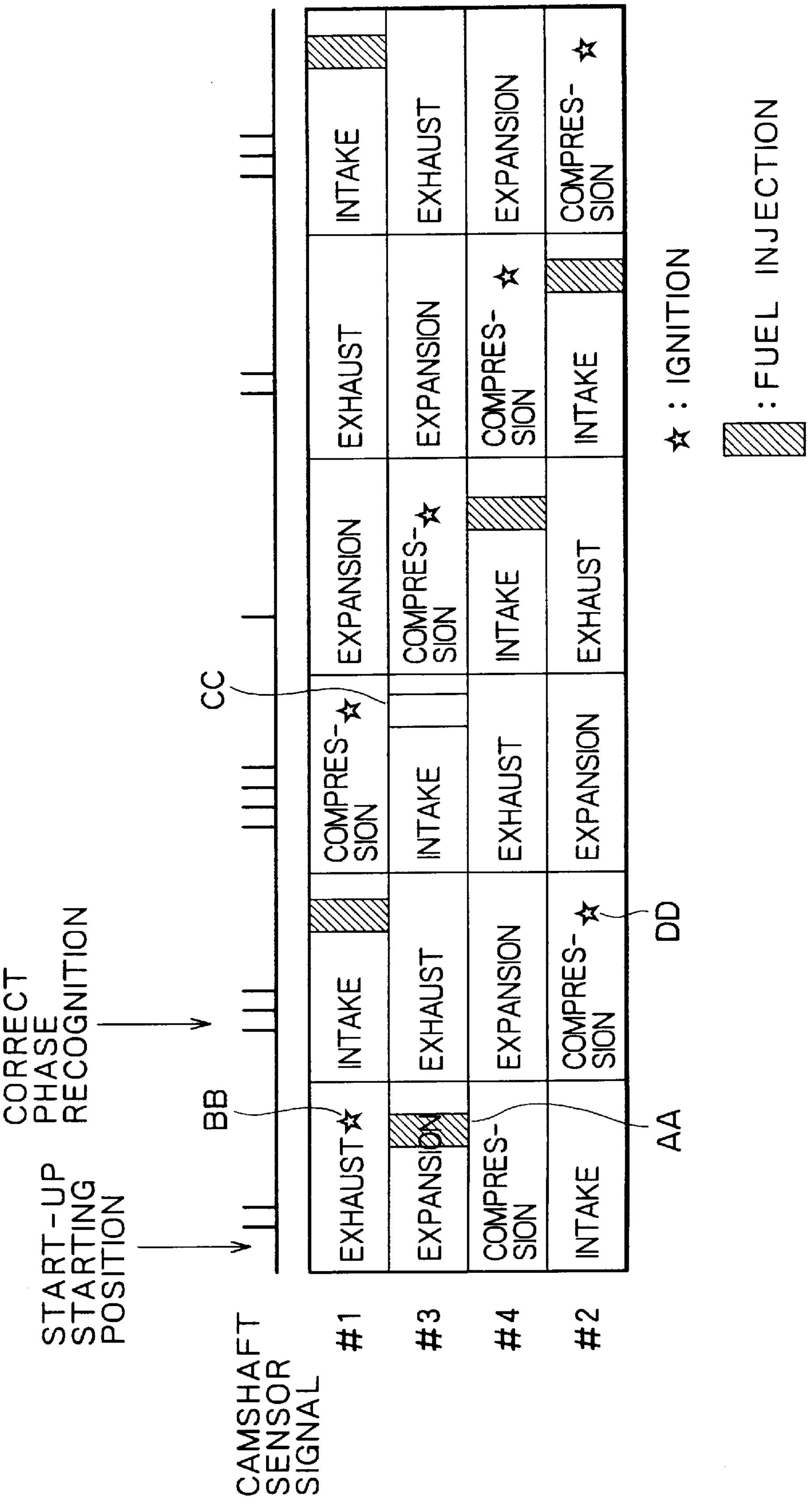
Figure 17:
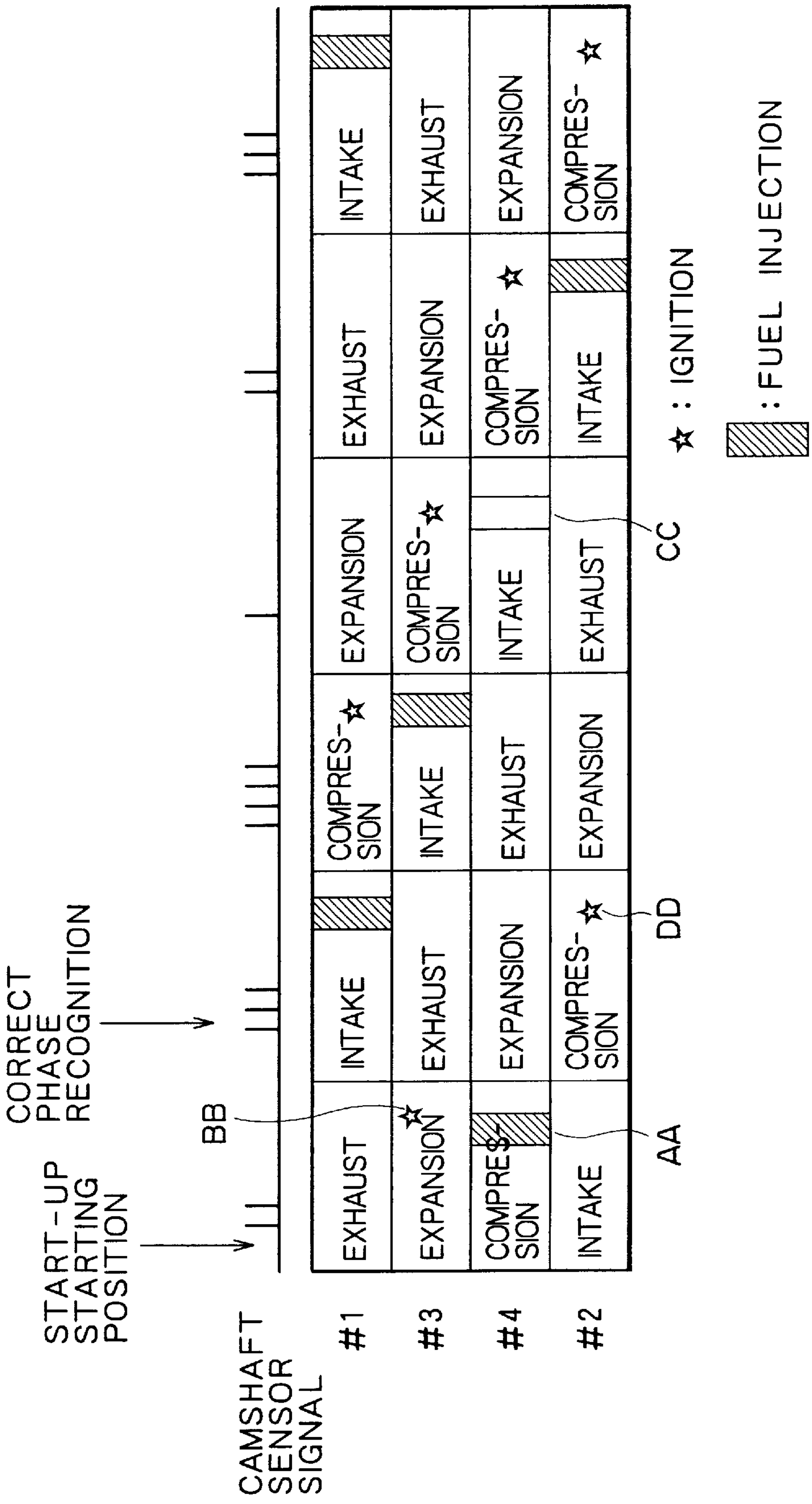

Further, if a case wherein stroke recognition of the cylinders by estimation are wrong with an in-cylinder injection engine is examined, then such conditions as illustrated in FIGS. 15, 16 and 17 apply. In particular, in FIG. 15, while first fuel injection should originally be performed for the #2 cylinder, fuel injection is performed for the #1 cylinder; in FIG. 16, while first fuel injection should originally be performed for the #2 cylinder, fuel injection is performed for the #3 cylinder, and in FIG. 17, while first fuel injection should originally be performed for the #2 cylinder, fuel injection is performed for the #4 cylinder. The forms of recognition just described are similar to those of the intake port fuel injection engine described hereinabove with reference to FIGS. 9, 10 and 110. Also with the in-cylinder injection engine, the phenomenon that fuel in a cylinder into which fuel injection is performed in error becomes surplus and, if fuel injection based on correct cylinder recognition is performed, the fuel becomes excessive is similar to that with the intake port fuel injection engine. However, with the in-cylinder injection engine, the behavior of injected fuel is different from that with the intake port injection engine. For example, referring to FIG. 15, fuel injected at a timing AA is injected into the cylinder in the exhaust stroke. Thereupon, however, the exhaust valve of the cylinder is open, and part of the injected fuel flows out from the exhaust value into the exhaust pipe while the other part remains in the cylinder. Accordingly, fuel injection at a timing CC must inject an amount of fuel equal to the amount by which the fuel has flowed out from the exhaust valve to the exhaust pipe in place of stopping injection as in the intake port injection engine.

In FIG, 16, fuel injected at a timing AA is injected into the cylinder in the expansion stroke, and since the exhaust stroke follows, part of the fuel flows out to the exhaust pipe similarly. Accordingly, fuel injection at a timing CC must inject an amount of fuel equal to the amount by which the fuel has flowed out from the exhaust valve to the exhaust pipe similarly as in the description above.

Also in FIG. 17, fuel injected at a timing AA is injected into the cylinder in the compression stroke similarly, and the exhaust stroke follows while the injected fuel is not burned in the cylinder as described above. Consequently, similarly as in the description given above with reference to FIG. 15, fuel injection at a timing CC must inject an amount of fuel equal to the amount by which the fuel has flowed out from the exhaust valve to the exhaust pipe.

By the operation described above, the in-cylinder injection engine can be started up without suffering from surplus excessive fuel supply even if fuel injection is performed based on erroneous estimated stroke recognition.

It is to be noted that, while the foregoing description relates to a 4-cylinder engine, the present invention can be applied also to an engine having any different number of cylinders because its behavior is similar.

Further, while it is described in the foregoing description that the control unit 17 and the control apparatus 33 are separate from each other, they may be formed as a unitary apparatus or as separate apparatus depending upon the functions and the scales of them and may selectively assume any form which exhibits a higher efficiency. Where they are formed as separate apparatus, information of, for example, discrimination of stopping of the engine or an operation amount of the accelerator may be used commonly by them using such means as communication.

While a preferred embodiment of the present invention has been described using specific terms, such description is for illustrative, purposes only, and it is to be understood that changes and variations may be made without departing from the spirit or scope of the following claims.

What is claimed is:

1. A control apparatus for an engine driving motor which has a function of driving a crankshaft of an engine and another function of generating electric power with power from said crankshaft, comprising:

a crankshaft position sensor for defecting a rotational position of said crankshaft when said engine stops; and control means for energizing, when said engine stops, said engine driving motor to rotate said crankshaft from the rotational position of said crankshaft detected when said engine steps to a dynamically neutral position of said crankshaft.

2. A control apparatus for an engine driving motor according to claim 1, wherein, when said engine is to be started up after said crankshaft stops, said control means recognizes the position of said crankshaft then as a stopping position of said crankshaft prior to recognition based on signals from said crankshaft position sensor and a camshaft position sensor which is provided for outputting a signal at a particular rotational position of a camshaft operatively connected to said crankshaft.

3. A control apparatus for an engine driving motor according to claim 2, wherein, when the position of said crankshaft recognized as a stopping position of said crankshaft prior to recognition based on signals from said crankshaft position sensor and said camshaft position sensor is different from an actually recognized position of said crankshaft, said control means outputs a signal for correcting a fuel amount in response to the difference.

4. A control apparatus for an engine driving motor according to claim 2, wherein, while said control means centrals said engine driving motor based on the position of said crankshaft recognized as a stopping position of said crankshaft prior to recognition based on signals from said crankshaft position sensor and said camshaft position sensor, said control means does not output a signal for ignition.

5. A control apparatus for an engine driving motor which has a function of driving a crankshaft of an engine and another function of generating electric power with power from said crankshaft, comprising:

a camshaft position sensor for outputting a signal at a particular rotational position of a camshaft operatively connected to said crankshaft; and control means for energizing, when said engine stops, said engine driving motor to rotate said crankshaft to a particular position which corresponds to a position of said camshaft immediately prior to the particular rotational position of said camshaft.

6. A control apparatus for an engine driving motor according to claim 5, wherein, after said crankshaft stops at the particular position, said control means controls said engine driving motor to keep said crankshaft at the particular position.

7. A control, apparatus for an engine driving motor according to claim 5, wherein, when said engine is to be started up after said crankshaft stops, said control means recognizes the position of said crankshaft then as a stopping position of said crankshaft prior to recognition based on signals from said camshaft position sensor and a crankshaft position sensor which is provided for detecting a rotational position of said crankshaft when said engine stops.

8. A control apparatus for an engine driving motor according to claim 7, wherein, when the position of said crankshaft recognized as a stopping position of said crankshaft prior to recognition based on signals from said crankshaft position sensor and said camshaft position sensor is different from an actually recognized position of said crankshaft, said control means outputs a signal for correcting a fuel amount in response to the difference.

9. A control apparatus for an engine driving motor according to claim 7, wherein, while said control means controls said engine driving motor based on the position of said crankshaft recognized as a stopping position of said crankshaft prior to recognition based on signals from said crankshaft position sensor and said camshaft position sensor, said control means does not output a signal for ignition.

10. A control apparatus for an engine driving motor which has a function of driving a crankshaft of an engine and another function of generating electric power with power from said crankshaft, comprising:

a crankshaft position sensor for detecting a rotational position of said crankshaft when said engine stops;

a camshaft position sensor for outputting a signal at a particular rotational position of a camshaft operatively connected to said crankshaft;

determination means for determining whether or not power supply to said engine driving motor should be stopped; and control means for energizing, when said engine stops and said determination means determines that the power supply to said engine driving motor should be stopped, said engine driving motor to rotate said crankshaft from the rotational position of said crankshaft detected when said engine stops to a dynamically neutral position of said crankshaft when said engine, stops, but energizing, when said engine stops and then said determination means determines that the power supply to said engine driving motor should not be stopped, said engine driving motor to rotate said crankshaft to a particular position which corresponds to a position of said camshaft immediately prior to the particular rotational position of said camshaft.

* * * * *